United States Patent
Jain

(10) Patent No.: US 10,880,814 B2
(45) Date of Patent: Dec. 29, 2020

(54) APPARATUSES TO AUTHORIZE AND ENABLE/DISABLE ENHANCED COVERAGE FUNCTIONALITY

(71) Applicant: APPLE INC., Cupertino, CA (US)

(72) Inventor: Puneet Jain, Hillsboro, OR (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/407,004

(22) Filed: May 8, 2019

(65) Prior Publication Data

US 2019/0274088 A1  Sep. 5, 2019

Related U.S. Application Data

(63) Continuation of application No. 16/093,912, filed as application No. PCT/US2017/039786 on Jun. 28, 2017, now Pat. No. 10,721,675.
(Continued)

(51) Int. Cl.
*H04W 48/04* (2009.01)
*H04W 4/70* (2018.01)
(Continued)

(52) U.S. Cl.
CPC ............ *H04W 48/04* (2013.01); *H04L 1/08* (2013.01); *H04W 4/70* (2018.02); *H04W 48/12* (2013.01); *H04W 60/04* (2013.01)

(58) Field of Classification Search
CPC ..... H04W 48/04; H04W 48/12; H04W 48/02; H04W 4/70; H04W 60/04
(Continued)

(56) References Cited

U.S. PATENT DOCUMENTS

2011/0116449 A1  5/2011  Hu et al.
2016/0277243 A1*  9/2016  Kim ................. H04L 41/0816
(Continued)

FOREIGN PATENT DOCUMENTS

| EP | 2836029 A1 | 2/2015 |
| EP | 2903363 A1 | 8/2015 |
| WO | 2015114694 A1 | 9/2014 |

OTHER PUBLICATIONS

U.S. Appl. No. 16/093,912, Non-Final Office Action, dated Jul. 9, 2019, 23 pages.
(Continued)

*Primary Examiner* — Anthony S Addy
*Assistant Examiner* — Farid Seyedvosoghi
(74) *Attorney, Agent, or Firm* — Stoel Rives LLP

(57) ABSTRACT

Apparatuses of wireless communication systems are disclosed. A User Equipment (UE) stores an enhanced coverage restricted parameter from a Mobility Management Entity (MME), and operates in the enhanced coverage mode if the enhanced coverage restricted parameter indicates that the UE is not restricted. The MME decodes an enhanced coverage restricted parameter received from a Home Subscriber Server (HSS), and generates a message to send the enhanced coverage restricted parameter to the UE. An eNode B decodes a message from the UE, the message indicating that the UE supports restriction for use of enhanced coverage. The eNB decodes an S1 Application Protocol (S1-AP) initial context set-up request message configured to indicate an enhanced coverage restricted parameter, the message received from the MME. The eNB operates in the enhanced coverage mode for the UE unless the enhanced coverage restricted parameter indicates that the enhanced coverage is restricted.

16 Claims, 9 Drawing Sheets

Related U.S. Application Data

(60) Provisional application No. 62/357,169, filed on Jun. 30, 2016.

(51) Int. Cl.
   *H04L 1/08* (2006.01)
   *H04W 48/12* (2009.01)
   *H04W 60/04* (2009.01)

(58) Field of Classification Search
   USPC .......................................................... 455/418
   See application file for complete search history.

(56) References Cited

U.S. PATENT DOCUMENTS

| | | | |
|---|---|---|---|
| 2017/0265086 A1* | 9/2017 | Worrall | H04W 4/70 |
| 2018/0302876 A1* | 10/2018 | Hoglund | H04W 24/02 |
| 2019/0028337 A1* | 1/2019 | Ryu | H04W 8/20 |
| 2019/0069211 A1* | 2/2019 | Ronneke | H04W 4/70 |

OTHER PUBLICATIONS

Intel, "Solution for Key Issue—Authorization of Coverage Enhancements", S2-163303, SA WG2 Meeting #116, Vienna, Austria, Agenda Item 6.15, Jul. 11-16, 2016, 4 pages.

Intel Corporation, "Email discussion report on 189bis#24[LTE/MTCe2] SIB Contents", R2-152161, 3GPP TSG RAN WG2 Meeting #90, Fukuoka, Japan, Agenda Item 7.42, May 25-29, 2015, 30 pages.

PCT/US2017/039786, International Search Report and Written Opinion, dated Oct. 11, 2017, 19 pages.

U.S. Appl. No. 16/093,912, Notice of Allowance, dated Mar. 18, 2020, 20 pages.

\* cited by examiner

APPARATUSES TO AUTHORIZE AND ENABLE/DISABLE ENHANCED COVERAGE FUNCTIONALITY

RELATED APPLICATIONS

This application is a continuation of U.S. patent application Ser. No. 16/093,912, filed Oct. 15, 2018, which is a national stage filing under 35 U.S.C. § 371 of International Patent Application No. PCT/US2017/039786, filed Jun. 28, 2017, which claims priority to U.S. Provisional Patent Application No. 62/357,169, filed Jun. 30, 2016, each of which is hereby incorporated by reference herein in its entirety.

TECHNICAL FIELD

This application relates generally to enhanced coverage functionality in wireless communication systems, and more specifically to enabling and disabling enhanced coverage in these systems.

BACKGROUND

Machine type communication (MTC) represents a significant growth opportunity for the 3GPP ecosystem. To support Internet of Things (IoT), 3GPP operators address usage scenarios with devices that are power efficient (e.g., with battery life of several years), that can be reached in challenging coverage conditions (e.g., indoors and in basements), and that are cheap enough so that they can be deployed on a mass scale and may even be disposable.

DETAILED DESCRIPTION OF PREFERRED EMBODIMENTS

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

In some embodiments, Coverage Enhancements may include a functionality that provides for redundant transmission of the same data packets to overcome some of the challenging coverage conditions that can accompany MTC or IoT communications.

The usage of Coverage Enhancements may require extensive resources from the network. Therefore it should be possible to authorize usage of the Coverage Enhancements' functionality to ensure that only specific subscribers (e.g., those subscribed to use this service) are able to benefit from the feature. Also, as mobile network operators may expose Coverage Enhancement as a service capability, it would be desirable for third-party service providers to query status or enable/disable this feature per individual user equipment (UEs) and/or mobile stations (MSs).

Some embodiments disclosed herein relate to the issue of authorization of use of Coverage Enhancement (also referred to herein as "enhanced coverage functionality," or "enhanced coverage mode"). In addition, some embodiments disclosed herein may relate to dynamic control (e.g., enable, disable, get status, etc.) of UE Coverage Enhancements feature by 3GPP operators (via O&M) or by third-party application providers. Disclosed herein are apparatuses, systems, and methods for enabling and disabling Coverage Enhancements. For example, an enhanced coverage parameter (e.g., an enhanced coverage restricted or enabled parameter, each of which would serve the same purpose of indicating whether or not Enhanced Coverage is enabled or disabled) may be stored (e.g., by the UE or MS, by a Mobility Management Entity (MME), by a Radio Access Network (RAN) Node (e.g., an eNB, a gNB, etc.), by an HSS, or by combinations thereof) and indicate whether the Coverage Enhancements should be used or not for a particular UE or MS. An example architecture of a system 100 (e.g., a cellular data system) in which embodiments of the disclosure may be implemented will now be discussed with reference to FIG. 1.

Figure 1:
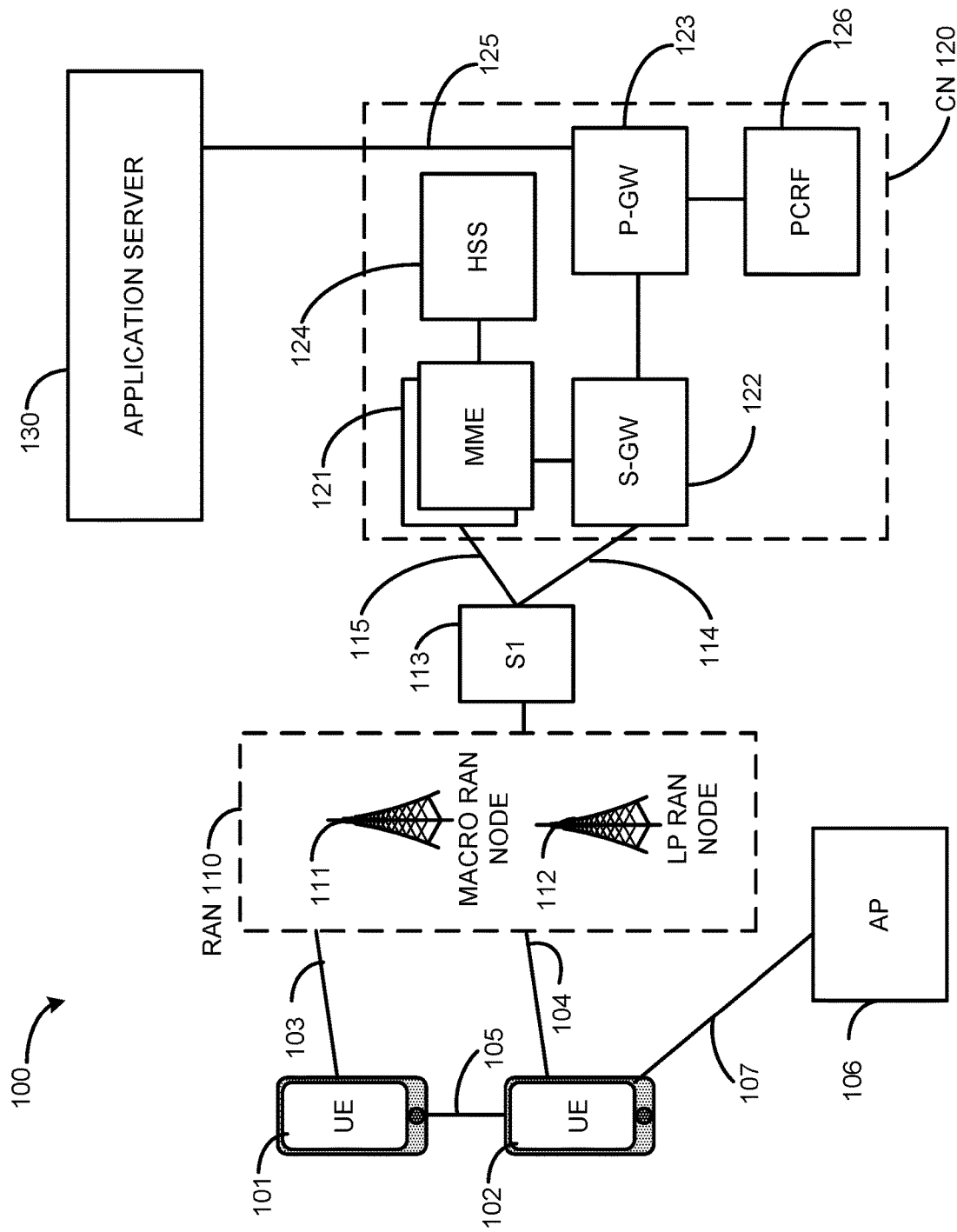
FIG. 1 illustrates an architecture of a system of a network in accordance with some embodiments.

FIG. 1 illustrates an architecture of a system 100 of a network in accordance with some embodiments. The system 100 is shown to include a user equipment (UE) 101 and a UE 102. The UEs 101 and 102 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 101 and 102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as enhanced resource element groups (EREGs). An ECCE may have other numbers of EREGs in some situations.

The RAN 110 is shown to be communicatively coupled to a core network (CN) 120—via an S1 interface 113. In embodiments, the CN 120 may be an evolved packet core (EPC) network, a NextGen Packet Core (NPC) network, or some other type of CN. In this embodiment the S1 interface 113 is split into two parts: an S1-U interface 114, which carries traffic data between the RAN nodes 111 and 112 and a serving gateway (S-GW) 122, and an S1-mobility management entity (MME) interface 115, which is a signaling interface between the RAN nodes 111 and 112 and MMEs 121.

In this embodiment, the CN 120 comprises the MMEs 121, the S-GW 122, a Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 toward the RAN 110, and route data packets between the RAN 110 and the CN 120. In addition, the S-GW 122 may be a local mobility anchor point for inter-RAN node handovers and also may provide an anchor for inter-3GPP mobility. Other responsibilities may include lawful intercept, charging, and some policy enforcement.

The P-GW 123 may terminate an SGi interface toward a PDN. The P-GW 123 may route data packets between the CN 120 (e.g., an EPC network) and external networks such as a network including an application server 130 (alternatively referred to as application function (AF)) via an Internet Protocol (IP) interface 125. Generally, the application server 130 may be an element offering applications that use IP bearer resources with the core network (e.g., UMTS Packet Services (PS) domain, LTE PS data services, etc.). In this embodiment, the P-GW 123 is shown to be communicatively coupled to the application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. A Policy and Charging Enforcement Function (PCRF) 126 is the policy and charging control element of the CN 120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 may be communicatively coupled to the application server 130 via the P-GW 123. The application server 130 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 130.

In some embodiments, the UEs 101, 102 include a device 700, which is discussed in more detail with reference to FIG. 7. In some embodiments, the device 700 includes baseband circuitry 704. The baseband circuitry 704 is discussed in more detail with reference to FIGS. 7 and 8. For example, the baseband circuitry 704 includes one or more baseband processors 704A-704D, each of which includes a memory interface MEM INT. The memory interface MEM INT of at least one of the baseband processors 704A-704D is configured to store an enhanced coverage restricted parameter received from the MME 121 on a memory 704G. The enhanced coverage restricted parameter indicates whether the UE 101 102 is restricted from operating in an enhanced coverage mode. The at least one of the baseband processors 704A-704D is enabled to operate the UE 101, 102 in the enhanced coverage mode. The at least one of the baseband processors 704A-704D is configured to determine whether the enhanced coverage mode should be used or not responsive to the enhanced coverage restricted parameter received from the MME 121, operate the UE 101 or 102 in the enhanced coverage mode if it is determined that the UE 101, 102 is not restricted from operating in the enhanced coverage mode, and disable the enhanced coverage mode if it is determined that the enhanced coverage mode is restricted.

In some embodiments, the MME 121 includes a data storage device configured to store information for enhanced coverage received from one or more of the RAN nodes 111, 112. The MME 121 also includes a processor configured to decode an enhanced coverage restricted parameter received from the HSS 124. The processor of the MME 121 also generates a message to send the enhanced coverage restricted parameter to the UE 101 or 102.

In some embodiments, one or both of the RAN nodes 111, 112 include a processor and a data storage device having computer-readable instruction (e.g., a computer program) stored thereon. The computer-readable instructions are configured to instruct the processor to decode a message received from the UE 101 and/or 102. The message from the UE 101 and/or 102 is configured to indicate that the UE 101 and/or 102 supports restriction for use of Enhanced Coverage (e.g., using an enhanced coverage restricted/allowed parameter). The computer-readable instructions are also configured to instruct the processor to decode an S1 Application Protocol (S1-AP) initial context set-up request message configured to indicate an enhanced coverage restricted parameter. The S1-AP initial context set-up request message is received from the MME 121. The enhanced coverage restricted parameter is configured to indicate whether the UE 101 and/or 102 is restricted to operate in an Enhanced Coverage mode. The processor operates in the enhanced coverage mode for the UE 101 and/or 102 unless the enhanced coverage restricted parameter indicates that the enhanced coverage is restricted.

Another example system in which enabling and disabling of Enhanced Coverage may be implemented includes an apparatus for a Mobile Station (MS). The MS includes a data storage device configured to store an enhanced coverage restricted parameter received from a Serving General Packet Radio Service (GPRS) Support Node (SGSN). The enhanced coverage restricted parameter indicates whether the MS is restricted from operating in the enhanced coverage mode. The MS also includes a processor enabled to operate the MS in the enhanced coverage mode. The processor is configured to determine whether the enhanced coverage mode should be used or not responsive to the enhanced coverage restricted parameter received from the SGSN. The processor of the MS is also configured to operate the MS in the enhanced coverage mode if it is determined that the MS is not restricted from operating in the enhanced coverage mode, and disable the enhanced coverage mode if it is determined that the enhanced coverage mode is restricted.

An example SGSN includes a processor operably coupled to a computer-readable storage medium having computer-readable instructions stored thereon, the computer-readable instruction configured to instruct a processor to perform operations of the SGSN. The operations of the SGSN include decoding an enhanced coverage restricted parameter from a Home Location Register (HLR), and generating a message to send the enhanced coverage restricted parameter to the MS.

Architectural Requirements

The following architecture requirements shall be supported:

The system should support procedures to authorize the use of Coverage Enhancements.

The system should support procedures to allow the third-party service provider to query the status of, enable, or disable Coverage Enhancements functionality per UE.

Authorization of Enhanced Coverage:

Embodiments disclosed herein may introduce a new subscription parameter in HSS/HLR called "Enhanced Coverage Restricted" or "Enhanced Coverage Allowed." In some embodiments, this subscription parameter may be referred to herein as "Enhanced Coverage Authorization Parameter." In some embodiments, this subscription parameter may be referred to herein as "Enhanced Coverage Restricted/Allowed parameter," or by other names.

This parameter is kept in HSS/HLR and specifies per PLMN whether enhanced coverage functionality is allowed or not allowed for each UE/MS, as discussed in the HSS data from TS 23.401. The table from TS 23.401 may be modified as shown below, with additions shown in underlined text. In some embodiments this subscription parameter may be kept for each PDN context (i.e., per APN basis).

| Field | Description |
| --- | --- |
| IMSI | IMSI is the main reference key. |
| MSISDN | The basic MSISDN of the UE (Presence of MSISDN is optional). |
| IMEI/IMEISV | International Mobile Equipment Identity-Software Version Number |
| External Identifier List | External Identifier(s) used in the external network(s) to refer to the subscription. See TS 23.682 [74] for more information. |
| MME Identity | The Identity of the MME currently serving this UE. |
| MME Capabilities | Indicates the capabilities of the MME with respect to core functionality e.g. regional access restrictions. |
| MS PS Purged from EPS | Indicates that the EMM and ESM contexts of the UE are deleted from the MME. |
| ODB parameters | Indicates that the status of the operator determined barring |
| Access Restriction | Indicates the access restriction subscription information. It may include different values for HPLMN and roaming case. It includes separate settings for WB-E-UTRAN and NB-IoT. |
| EPS Subscribed Charging Characteristics | The charging characteristics for the UE, e.g. normal, prepaid, flat-rate, and/or hot billing subscription. |
| Trace Reference | Identifies a record or a collection of records for a particular trace. |
| Trace Type | Indicates the type of trace, e.g. HSS trace, and/or MME/Serving GW/PDN GW trace. |
| OMC Identity | Identifies the OMC that shall receive the trace record(s). |
| Subscribed-UE-AMBR | The Maximum Aggregated uplink and downlink MBRs to be shared across all Non-GBR bearers according to the subscription of the user. |
| APN-OI Replacement | Indicates the domain name to replace the APN OI when constructing the PDN GW FQDN upon which to perform a DNS resolution. This replacement applies for all the APNs in the subscriber's profile. See TS 23.003 [9] clause 9.1.2 for more information on the format of domain names that are allowed in this field. |
| RFSP Index | An index to specific RRM configuration in the E-UTRAN |
| URRP-MME | UE Reachability Request Parameter indicating that UE activity notification from MME has been requested by HSS. |

-continued

| Field | Description |
|---|---|
| CSG Subscription Data | The CSG Subscription Data is a list of CSG IDs per PLMN and for each CSG ID optionally an associated expiration date which indicates the point in time when the subscription to the CSG ID expires; an absent expiration date indicates unlimited subscription.<br>For a CSG ID that can be used to access specific PDNs via Local IP Access, the CSG ID entry includes the corresponding APN(s). |
| VPLMN LIPA Allowed | Specifies per PLMN whether the UE is allowed to use LIPA. |
| EPLMN list | Indicates the Equivalent PLMN list for the UE's registered PLMN. |
| Subscribed Periodic RAU/TAU Timer | Indicates a subscribed Periodic RAU/TAU Timer value |
| MPS CS priority | Indicates that the UE is subscribed to the eMLPP or 1x RTT priority service in the CS domain. |
| UE-SRVCC-Capability | Indicates whether the UE is UTRAN/GERAN SRVCC capable or not. |
| MPS EPS priority | Indicates that the UE is subscribed to MPS in the EPS domain. |
| UE Usage Type | Indicates the usage characteristics of the UE for use with Dedicated Core Networks (see clause 4.3.25). |
| Group ID-list | List of subscribed group(s) that the UE belongs to |
| Communication Patterns | Indicates per UE the Communication Patterns and their corresponding validity times as specified in TS 23.682 [74]. The Communication Patterns are not provided to the SGSN. |
| Monitoring Event Information Data | Describes the monitoring event configuration information. See TS 23.682 [74] for more information. |
| Enhanced Coverage Restricted/Allowed | Specifies per PLMN whether Enhanced Coverage is restricted/allowed. |
| Each subscription contains one or more PDN subscription contexts: | |
| Context Identifier | Index of the PDN subscription context (Note 8). |
| PDN Address | Indicates subscribed IP address(es). |
| PDN Type | Indicates the subscribed PDN Type (IPv4, IPv6, IPv4v6, Non-IP) |
| APN-OI Replacement | APN level APN-OI Replacement which has the same role as UE level APN-OI Replacement but with higher priority than UE level APN-OI Replacement. This is an optional parameter. When available, it shall be used to construct the PDN GW FQDN instead of UE level APN-OI Replacement. |
| Access Point Name (APN) | A label according to DNS naming conventions describing the access point to the packet data network (or wildcard) (Note 6). |
| Invoke SCEF Selection | Indicates whether this APN is used for establishing PDN connection to the SCEF |
| SCEF ID | Indicates the FQDN or IP address of the SCEF which is to be selected for this APN. It is required if "Invoke SCEF Selection" indicator is set. |
| SIPTO permissions | Indicates whether the traffic associated with this APN is prohibited for SIPTO, allowed for SIPTO excluding SIPTO at the local network, allowed for SIPTO including SIPTO at the local network or allowed for SIPTO at the local network only (NOTE 7). |
| LIPA permissions | Indicates whether the PDN can be accessed via Local IP Access. Possible values are: LIPA-prohibited, LIPA-only and LIPA-conditional. |
| WLAN offloadability | Indicates whether the traffic associated with this APN is allowed to be offloaded to WLAN using the WLAN/3GPP Radio Interworking feature or if it shall be kept on 3GPP access (see clause 4.3.23). The indication may contain separate values per RAT (E-UTRA and UTRA). |
| EPS subscribed QoS profile | The bearer level QoS parameter values for that APN's default bearer (QCI and ARP) (see clause 4.7.3). |
| Subscribed-APN-AMBR | The maximum aggregated uplink and downlink MBRs to be shared across all Non-GBR bearers, which are established for this APN. |

| Field | Description |
| --- | --- |
| EPS PDN Subscribed Charging Characteristics | The charging characteristics of this PDN Subscribed context for the UE, e.g. normal, prepaid, flat-rate, and/or hot billing subscription. The charging characteristics is associated with this APN. |
| VPLMN Address Allowed | Specifies per VPLMN whether for this APN the UE is allowed to use the PDN GW in the domain of the HPLMN only, or additionally the PDN GW in the domain of the VPLMN. |
| PDN GW identity | The identity of the PDN GW used for this APN. The PDN GW identity may be either an FQDN or an IP address. The PDN GW identity refers to a specific PDN GW. |
| PDN GW Allocation Type | Indicates whether the PDN GW is statically allocated or dynamically selected by other nodes. A statically allocated PDN GW is not changed during PDN GW selection. |
| PLMN of PDN GW | Identifies the PLMN in which the dynamically selected PDN GW is located. |
| Homogenous Support of IMS Voice over PS Sessions for MME | Indicates per UE and MME if "IMS Voice over PS Sessions" is homogeneously supported in all TAs in the serving MME or homogeneously not supported, or, support is non-homogeneous/unknown, see clause 4.3.5.8A. |
| List of APN-PDN GW ID relations (for PDN subscription context with wildcard APN): | |
| APN-P-GW relation #n | The APN and the identity of the dynamically allocated PDN GW of a PDN connection that is authorized by the PDN subscription context with the wildcard APN. The PDN GW identity may be either an FQDN or an IP address. The PDN GW identity refers to a specific PDN GW. |

The Enhanced Coverage Restricted or Allowed parameter is downloaded to the MME/SGSN during ATTACH and TAU/RAU procedure.

Figure 2:
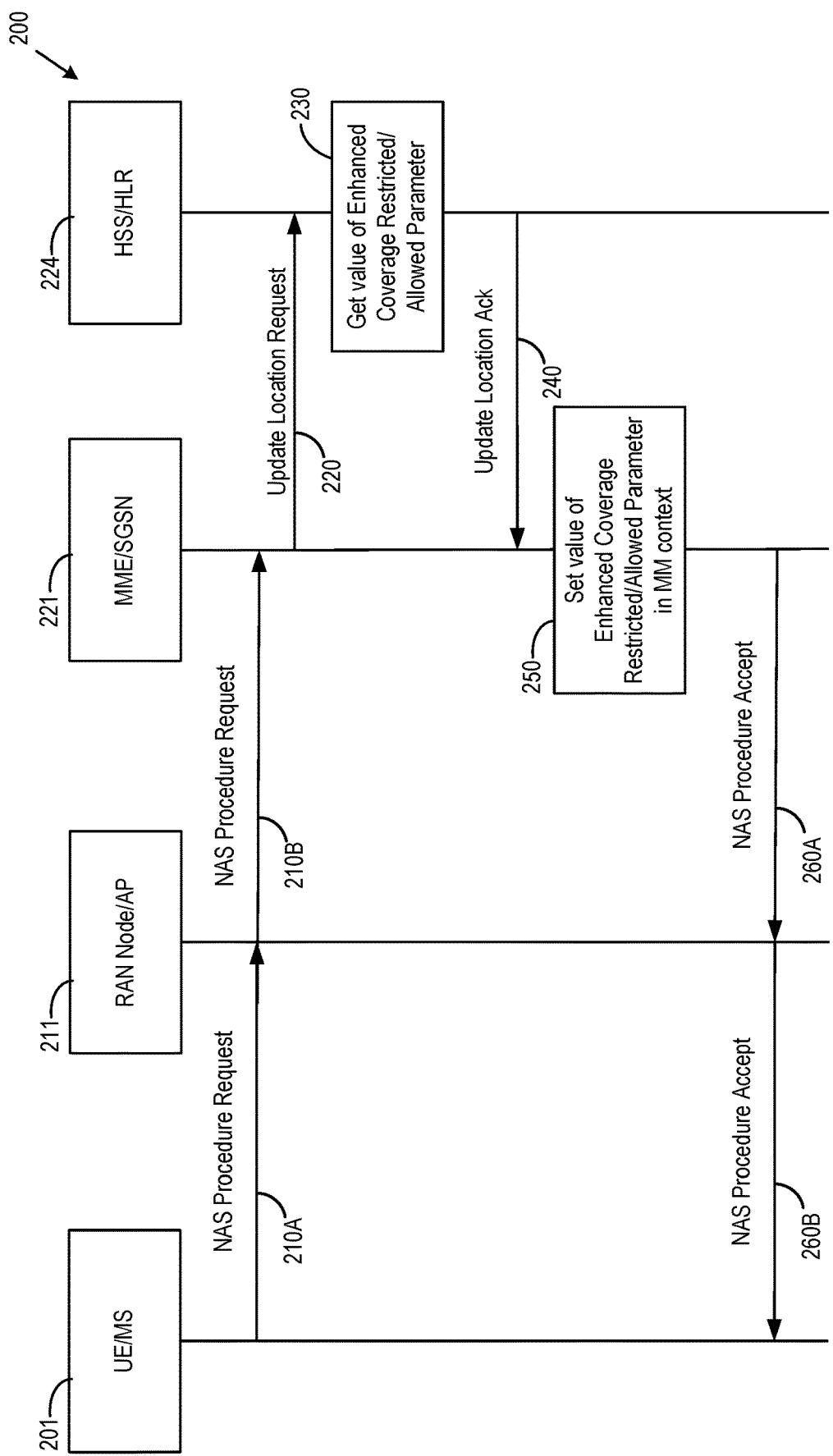
FIG. 2 is a simplified signal flow diagram illustrating a procedure for Enhanced Coverage information update, according to some embodiments.

FIG. 2 is a simplified signal flow diagram illustrating a procedure 200 for Enhanced Coverage information update as part of Attach, TAU/RAU procedure, according to some embodiments. The signal flow diagram of FIG. 2 illustrates messages exchanged between and operations performed by a UE/MS 201 (the UE similar to the UE 101/102 of FIG. 1), a RAN node/Access Point (AP) 211 (the RAN node similar to the RAN node 111/112 of FIG. 1), an MME/SGSN 221 (the MME similar to the MME 121 of FIG. 1), and an HSS/Home Location Register (HLR) 224 (the HSS similar to the HSS 124 of FIG. 1).

Not all operations of Attach and TAU/RAU procedure are shown in FIG. 2 for the sake of simplicity. The UE/MS 201 is configured to generate and send 210A, 210B a NAS Procedure Request (e.g., Attach Request, TAU/RAU Request) to the MME/SGSN 221 via the RAN Node/AP 211. In response, the MME/SGSN 221 may be configured to generate and transmit 220 an Update Location Request to the HSS/HLR 224. The HSS/HLR 224, on getting the Update Location Request from the MME/SGSN 221, gets 230 the value of Enhanced Coverage Restricted/Allowed parameter and sends 240 the value of the Enhanced Coverage Restricted/Allowed parameter along with the other subscription parameters to the MME/SGSN 221 in an Update Location Ack message. The MME/SGSN 221 on receiving then sets 250 and stores the value of Enhanced Coverage Parameter (e.g., Enhanced Coverage Allowed, Enhanced Coverage Restricted, etc.) in Mobile Management (MM) and Evolved Packet System (EPS) bearer context as shown in underlined text in the table below.

| Field | Description |
| --- | --- |
| S-GW IP address for S11/S4 | S-GW IP address for the S11 and S4 interfaces |
| S-GW TEID for S11/S4 | S-GW Tunnel Endpoint Identifier for the S11 and S4 interfaces. |
| SGSN IP address for S3 | SGSN IP address for the S3 interface (used if ISR is activated for the GERAN and/or UTRAN capable UE) |
| SGSN TEID for S3 | SGSN Tunnel Endpoint Identifier for S3 interface (used if ISR is activated for the E-UTRAN capable UE) |
| eNodeB Address in Use for S1-MME | The IP address of the eNodeB currently used for S1-MME. |
| eNB UE S1AP ID | Unique identity of the UE within eNodeB. |
| MME UE S1AP ID | Unique identity of the UE within MME. |
| Subscribed UE-AMBR | The Maximum Aggregated uplink and downlink MBR values to be shared across all Non-GBR bearers according to the subscription of the user. |

-continued

| Field | Description |
| --- | --- |
| UE-AMBR | The currently used Maximum Aggregated uplink and downlink MBR values to be shared across all Non-GBR bearers. |
| Serving PLMN-Rate-Control | The Serving PLMN-Rate-Control limits the maximum number of NAS Data PDUs per deci hour sent per direction (uplink/downlink) using the Control Plane CIoT EPS Optimization for a UE. |
| EPS Subscribed Charging Characteristics | The charging characteristics for the UE e.g. normal, prepaid, flat rate and/or hot billing. |
| Subscribed RFSP Index | An index to specific RRM configuration in the E-UTRAN that is received from the HSS. |
| RFSP Index in Use | An index to specific RRM configuration in the E-UTRAN that is currently in use. |
| Trace reference | Identifies a record or a collection of records for a particular trace. |
| Trace type | Indicates the type of trace |
| Trigger id | Identifies the entity that initiated the trace |
| OMC identity | Identifies the OMC that shall receive the trace record(s). |
| URRP-MME | URRP-MME indicating that the HSS has requested the MME to notify the HSS regarding UE reachability at the MME |
| DL Data Buffer Expiration Time | When extended buffering of DL data has been invoked for UEs that use power saving functions e.g. PSM, this time is when the buffer will expire in the Serving GW. |
| Suggested number of buffered downlink packets | Suggested number of buffered downlink packets at extended buffering. This is an optional parameter. |
| CSG Subscription Data | The CSG Subscription Data is associated lists of CSG IDs for the visiting PLMN and the equivalent PLMNs of the visiting PLMN, and for each CSG ID optionally an associated expiration date which indicates the point in time when the subscription to the CSG ID expires; and absent expiration date indicates unlimited subscription. For a CSG ID that can be used to access specific PDNs via Local IP Access, the CSG ID entry includes the corresponding APN(s). |
| LIPA Allowed | Specifies whether the UE is allowed to use LIPA in this PLMN. |
| Subscribed Periodic RAU/TAU Timer | Indicates a subscribed Periodic RAU/TAU Timer value. |
| MPS CS priority | Indicates that the UE is subscribed to the eMLPP or 1× RTT priority service in the CS domain. |
| MPS EPS priority | Indicates that the UE is subscribed to MPS in the EPS domain. |
| Voice Support Match Indicator | An indication whether the UE radio capabilities are compatible with the network configuration (e.g. whether the SRVCC and frequency support by the UE matches those that the network relies upon for voice coverage). The MME uses it as an input for setting the IMS voice over PS Session Supported Indication. |
| Homogenous Support of IMS Voice over PS Sessions | Indicates per UE if "IMS Voice over PS Sessions" is homogeneously supported in all TAs in the serving MME or homogeneously not supported, or, support is non-homogeneous/unknown, see clause 4.3.5.8A. |
| UE Radio Capability for Paging Information | Information used by the eNB to enhance the paging towards the UE (see clause 5.11.4). The UE Radio Capability for Paging Information is defined in TS 36.413 [36]. |

-continued

| Field | Description |
|---|---|
| Information On Recommended Cells And ENBs For Paging | Information sent by the eNB, and used by the MME when paging the UE to help determine the eNBs to be paged as well as to provide the information on recommended cells to each of these eNBs, in order to optimize the probability of successful paging while minimizing the signaling load on the radio path. |
| Paging Attempt Count | Information provided by the MME and used by the eNB to optimize signaling load and the use of network resources to successfully page a UE. |
| Information for Enhanced Coverage | Information for Enhanced Coverage level and cell ID provided by the last eNB the UE was connected to. |
| Enhanced Coverage Restricted/Allowed | Specifies whether the UE is restricted/allowed to use enhanced coverage feature in this PLMN. |
| UE Usage Type | Indicates the usage characteristics of the UE for use with Dedicated Core Networks (see clause 4.3.25). |
| Group ID-list | List of the subscribed group(s) that the UE belongs to |
| Monitoring Event Information Data | Describes the monitoring event configuration information. See TS 23.682 [74] for more information. |
| Delay Tolerant Connection | Indicates that the PDN connection is delay tolerant such that the PDN GW supports holding the procedure, after receiving a reject with a cause indicating that UE is temporarily not reachable due to power saving, until the PDN GW receives a message indicating that the UE is available for end to end signaling |
| For each active PDN connection: | |
| APN in Use | The APN currently used. This APN shall be composed of the APN Network Identifier and the default APN Operator Identifier, as specified in TS 23.003 [9], clause 9.1.2. Any received value in the APN OI Replacement field is not applied here. |
| APN Restriction | Denotes the restriction on the combination of types of APN for the APN associated with this EPS bearer Context. |
| APN Subscribed | The subscribed APN received from the HSS. |
| PDN Type | IPv4, IPv6, IPv4v6 or Non-IP |
| SCEF ID | The IP address of the SCEF currently being used for providing PDN connection to the SCEF. |
| IP Address(es) | IPv4 address and/or IPv6 prefix Note: The MME might not have information on the allocated IPv4 address. Alternatively, following mobility involving a pre-release 8 SGSN, this IPv4 address might not be the one allocated to the UE. |
| EPS PDN Charging Characteristics | The charging characteristics of this PDN connection, e.g. normal, prepaid, flat-rate and/or hot billing. |
| APN-OI Replacement | APN level APN-OI Replacement which has same role as UE level APN-OI Replacement but with higher priority than UE level APN-OI Replacement. This is an optional parameter. When available, it shall be used to construct the PDN GW FQDN instead of UE level APN-OI Replacement. |
| SIPTO permissions | Indicates whether the traffic associated with this APN is prohibited for SIPTO, allowed for SIPTO excluding SIPTO at the local network, allowed for SIPTO including SIPTO at the local network or allowed for SIPTO at the local network only. |

-continued

| Field | Description |
|---|---|
| Local Home Network ID | If SIPTO@LN is enabled for this PDN connection it indicates the identity of the Local Home Network to which the (H)eNB belongs. |
| LIPA permissions | Indicates whether the PDN can be accessed via Local IP Access. Possible values are: LIPA-prohibited, LIPA-only and LIPA-conditional. |
| WLAN offloadability | Indicates whether the traffic associated with this PDN connection is allowed to be offloaded to WLAN using the WLAN/3GPP Radio Interworking feature or if it shall be kept on 3GPP access (see clause 4.3.23). The indication may contain separate values per RAT (E-UTRA and UTRA). |
| VPLMN Address Allowed | Specifies whether the UE is allowed to use the APN in the domain of the HPLMN only, or additionally the APN in the domain of the VPLMN. |
| PDN GW Address in Use (control plane) | The IP address of the PDN GW currently used for sending control plane signaling. |
| PDN GW TEID for S5/S8 (control plane) | PDN GW Tunnel Endpoint Identifier for the S5/S8 interface for the control plane. |
| MS Info Change Reporting Action | Need to communicate change in user Location Information to the PDN GW with this EPS bearer Context. |
| CSG Information Reporting Action | Need to communicate change in User CSG Information to the PDN GW with this EPS bearer Context. This field denotes separately whether the MME/SGSN are requested to send changes in User CSG Information for (a) CSG cells, (b) hybrid cells in which the subscriber is a CSG member and (c) hybrid cells in which the subscriber is not a CSG member. |
| Presence Reporting Area Action | Need to communicate a charge of UE presence in Presence Reporting Area. This field denotes separately the Presence Reporting Area identifier, and the list of Presence Reporting Area elements (if provided by the PDN GW). |
| EPS subscribed QoS profile | The bearer level QoS parameter values for that APN's default bearer (QCI and ARP) (see clause 4.7.3). |
| Subscribed APN-AMBR | The Maximum Aggregated uplink and downlink MBR values to be shared across all Non-GBR bearers, which are established for this APN, according to the subscription of the user. |
| APN-AMBR | The Maximum Aggregated uplink and downlink MBR values to be shared across all Non-GBR bearers, which are established for this APN, as decided by the PDN GW. |
| PDN GW GRE Key for uplink traffic (user plane) | PDN GW assigned GRE Key for the S5/S8 interface for the user plane for uplink traffic. (For PMIP-based S5/S8 only) |
| Default bearer | Identifies the EPS Bearer ID of the default bearer within the given PDN connection. |
| low access priority | Indicates that the UE requested low access priority when the PDN connection was opened. NOTE: The low access priority indicator is only stored for the purpose to be included in charging records. |
| Communication Patterns | Indicates per UE the Communication Patterns and their corresponding validity times as specified in TS 23.682 [74]. The Communication Patterns are not provided to the SGSN. |

| Field | Description |
| --- | --- |
| For each bearer within the PDN connection: | |
| EPS Bearer ID | An EPS bearer identity uniquely identifies an EPS bearer for one UE accessing via E-UTRAN |
| TI | Transaction Identifier |
| S-GW IP address for S1-u/S11-u | IP address of the S-GW for the S1-u/S11-u interfaces. The S11-u interface is used for Control Plane CIoT EPS optimization. |
| S-GW TEID for S1-u/S11-u | Tunnel Endpoint Identifier of the S-GW for the S1-u/S11-u interface. The S11-u interface is used for Control Plane CIoT EPS optimization. |
| MME IP address for S11-u | MME IP address for the S11-u interface (Used by the S-GW). The S11-u interface is used for Control Plane CIoT EPS optimization. |
| MME TEID for S11-u | MME Tunnel Endpoint Identifier for the S11-u interface (Used by the S-GW). The S11-u interface is used for Control Plane CIoT EPS optimization. |
| PDN GW TEID for S5/S8 (user plane) | P-GW Tunnel Endpoint Identifier for the S5/S8 interface for the user plane. (Used for S-GW change only). Note The PDN GW TEID is needed in MME context as S-GW relocation is triggered without interaction with the source S-GW requires this Information Element, so it must be stored by the MME. |
| PDN GW IP address for S5/S8 (user plane) | P GW IP address for user plane for the S5/S8 interface for the user plane. (Used for S-GW change only). NOTE: The PDN GW IP address for user plane is needed in MME context as S-GW relocation is triggered without interaction with the source S-GW, e.g. when a TAU occurs. The Target S GW requires this Information Element, so it must be stored by the MME. |
| EPS bearer QoS | QCI and ARP Optionally: GBR and MBR for BGR bearer |
| TFT | Traffic Flow Template. (For PMIP-based S5/S8 only) |

In some embodiments, the MME/SGSN 221 can send 260A, 260B (e.g., via the RAN Node/AP 211) Enhanced Coverage Restricted/Allowed parameter to the UE/MS 201 (e.g., in a NAS Procedure Accept message). In some embodiments, the MME/SGSN 221 may send 260A, 260B the Enhanced Coverage Restricted/Allowed parameter to the UE/MS 201 in NAS messages (e.g., a NAS Procedure Accept message relayed from the MME SGSN 221 to the UE/MS 201 by the RAN Node/AP 211). By way of non-limiting example, the MME/SGSN 221 may send 260A, 260B the Enhanced Coverage Restricted/Allowed parameter to the UE/MS 201 in an Attach Accept message or a TAU/RAU Accept message. The MME/SGSN 221 can provide Enhanced Coverage Restrictd/Allowed parameter to the UE/MS 201 in NAS messages for example—Attach Accept, TAU/RAU Accept, Periodic TAU/RAU Accept, Service Accept, Detach Accept, etc. This parameter may also be provided in ESM NAS messages.

Enhanced Coverage Allowed/Restricted parameter may also be provided in unsuccessful/failure NAS messages from the MME/SGSN 221 to the UE/MS 201 such as Attach Reject, TAU/RAU Reject, Service Reject, PDN connectivity reject etc.

If the UE/MS 201 receives Enhanced Coverage Restricted/Allowed parameter in any of the NAS messages and if the parameter indicates that Enhanced coverage is allowed (or not restricted), the UE/MS 201 may operate in Enhanced Coverage mode. If the parameter indicates that Enhanced Coverage is not allowed (or restricted) then the UE/MS 201 shall not use enhanced coverage feature.

Enhanced Coverage Allowed parameter may also be configured in the UE/MS 201 using different mechanism such as OMA-DM or SIM-OTA. A UE/MS 201 that is configured for Enhanced Coverage Restricted/Allowed parameter should act accordingly. Configured value may be overridden with the value received by the UE/MS 201 as part of NAS procedure.

Figure 3:
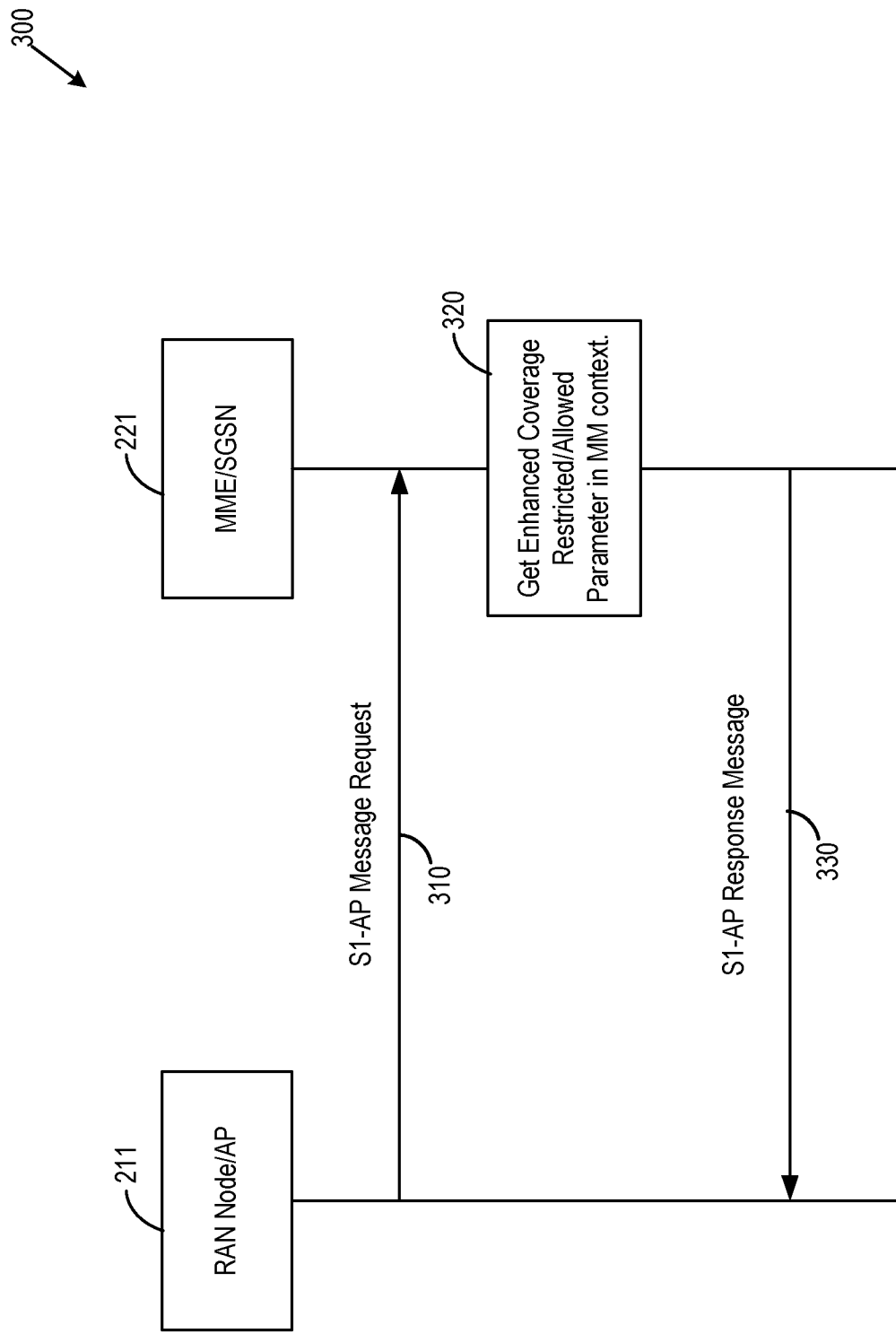
FIG. 3 is a simplified signal flow diagram illustrating an Enhanced Coverage information update procedure, according to some embodiments.

FIG. 3 is a simplified signal flow diagram illustrating an Enhanced Coverage information update procedure 300 as part of an S1-AP procedure. The RAN Node/AP 211 may be configured to transmit 310 an S1-AP Message request to the MME/SGSN 221 (e.g., in an S1-AP initial UE message). In response, the MME/SGSN 221 gets 320 the Enhanced Coverage Restricted/Allowed parameter in MM context. The MME/SGSN 211 sends 330 the Enhanced Coverage Allowed parameter (or Enhanced Coverage Restricted parameter) to the RAN Node/AP 211 in an S1-AP response messages. For example, the MME/SGSN 211 may send 330 the Enhanced Coverage Restricted/Allowed parameter in an S1-AP initial context set-up request message, S1-AP DL messages, S1-AP resume response, etc.

If the RAN Node/AP 211 receives Enhanced Coverage Restricted/Allowed parameter in any of the S1-AP messages and if the parameter indicates that Enhanced Coverage is allowed (or not restricted), the RAN Node/AP 211 may operate in Enhanced Coverage mode and provide Coverage Enhancement (CE) mode to the UE/MS 201 (FIG. 2). If the parameter indicates that Enhanced Coverage is not allowed (or is restricted) then the RAN Node/AP 211 shall not use the Enhanced Coverage feature.

In some embodiments, Enhanced Coverage Restricted/Allowed parameter (or Enhanced Coverage Restricted parameter) may be kept for each PDN connection or for each bearer within the PDN connection.

Figure 4:
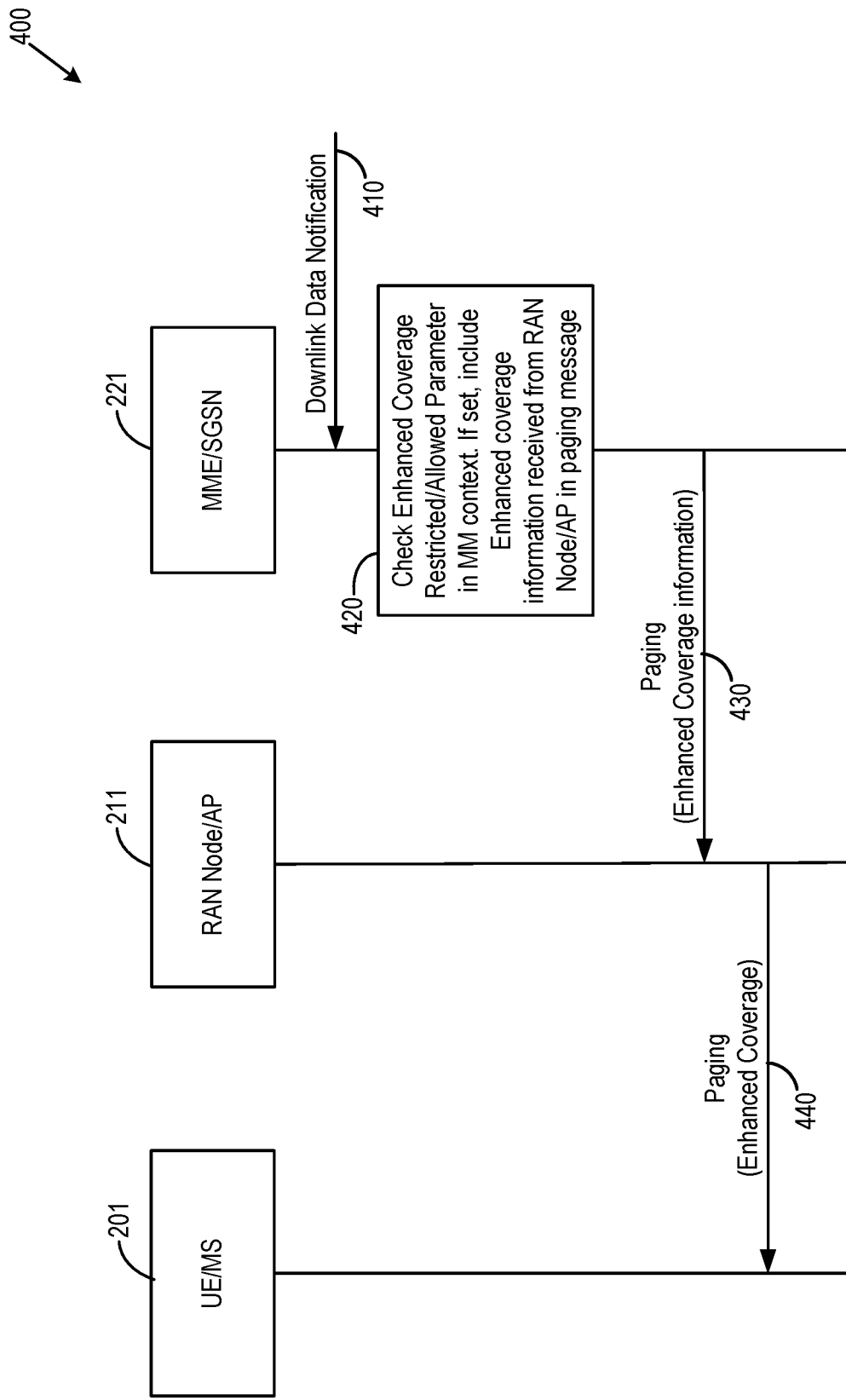
FIG. 4 is a simplified flow diagram illustrating a procedure for paging with Enhanced Coverage, according to some embodiments.

FIG. 4 is a simplified signal flow diagram illustrating a procedure 400 for paging with Enhanced Coverage (e.g., setting enhanced coverage in a paging message). As shown in FIG. 4, the MME/SGSN 221, on receiving 410 a Downlink Data Notification, checks 420 if Enhanced Coverage Restricted/Allowed parameter is set in the MME/SGSN 221 MM or EPS bearer context.

If the MME/SGSN 221 has information for Enhanced Coverage stored, and Enhanced Coverage Restricted/Allowed parameter is set, then the MME/SGSN 221 shall include 430 information for Enhanced Coverage in the paging message for all RAN Nodes/APs 211 selected by the MME/SGSN 221 for paging. This is shown in element 430 of FIG. 4. If the information for Enhanced Coverage for a particular UE/MS 201 is included 430 in the paging message, the RAN Node/AP 211 may page 440 the UE/MS 201 using enhanced coverage.

If the MME/SGSN 221 has information for Enhanced Coverage stored, and Enhanced Coverage Restricted/Allowed parameter is not set (i.e., value indicates enhanced coverage is not authorized or is disabled) then the MME/SGSN 221 shall not include 430 information for Enhanced Coverage in the paging message for all RAN Nodes/APs 211 selected by the MME/SGSN 221 for paging. Rather, in this case the RAN Node/AP 211 does not enable enhanced coverage options for this UE/MS 201.

In certain embodiments, if the MME/SGSN 221 has information for Enhanced Coverage stored, and Enhanced Coverage Restricted/Allowed parameter is not set (i.e., value indicates Enhanced Coverage is not authorized or is disabled), the MME/SGSN 221 may send explicitly IE in paging message stating that enhanced coverage should not be used (i.e., the RAN Node/AP 211 treats the UE/MS 201 in the normal coverage). In this case enhanced coverage features like CE mode A and CE mode B are not used. No repetitions are used.

Figure 5:
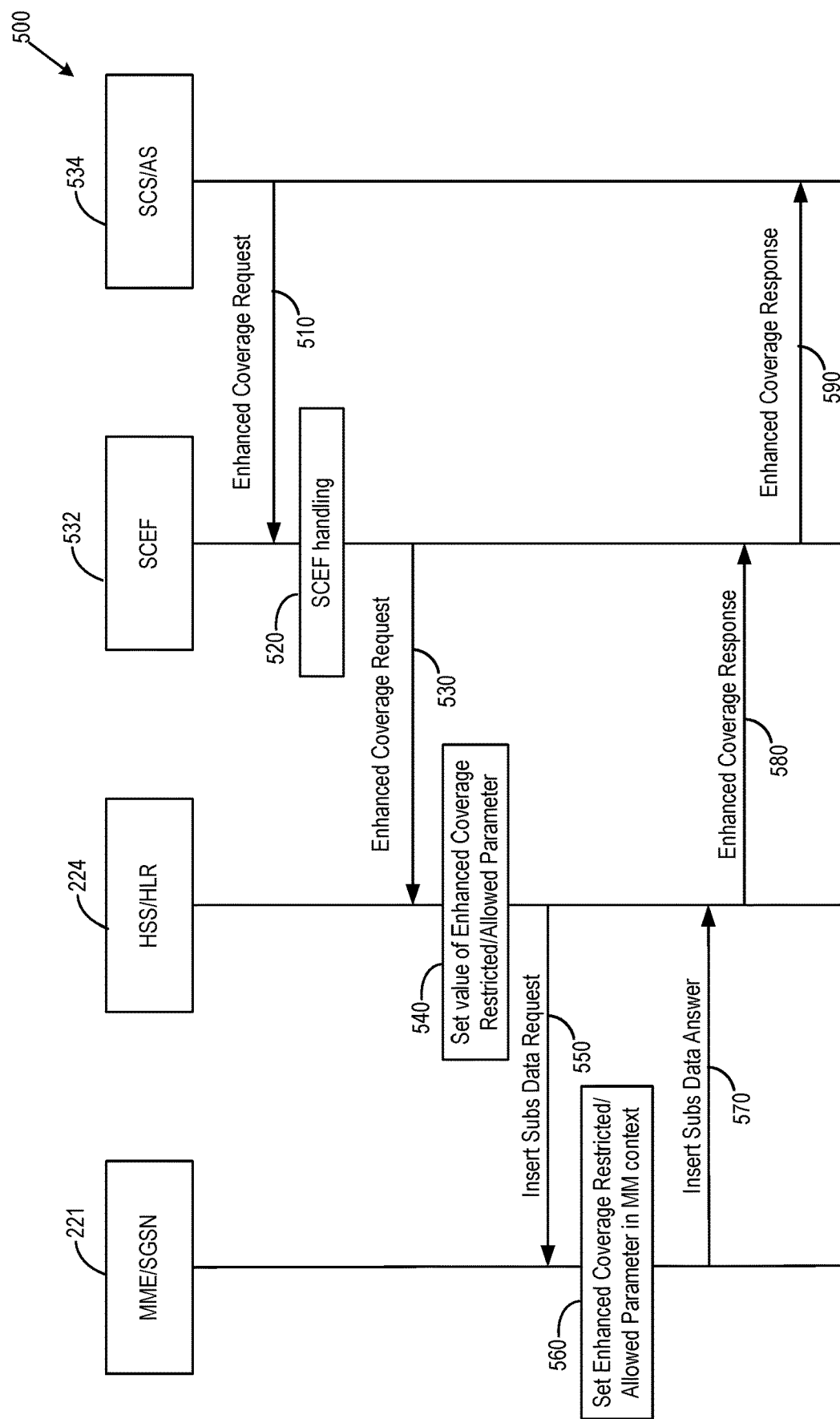
FIG. 5 is a simplified signal flow diagram illustrating a procedure to enable and disable Enhanced Coverage feature, according to some embodiments.

FIG. 5 is a simplified signal flow diagram illustrating a procedure 500 to enable and disable an Enhanced Coverage feature. An SCS/AS 534 sends 510 an Enhanced Coverage Request (External Identifier(s) or MSISDN(s), SCS/AS Identifier, SCS/AS Reference ID, Type, Maximum Number of Reports, Duration) message (e.g., Type=Enable/Disable) to an SCEF 532.

At operation 520 (SCEF handling), the SCEF 532 stores SCS/AS Reference ID, SCS/AS Identifier, Duration, and Maximum Number of Reports. The SCEF 532 assigns an SCEF Reference ID. Based on operator policies, if either the SCS/AS 534 is not authorized to perform this request (e.g., if the SLA does not allow for it) or the Enhanced Coverage Request is malformed or the SCS/AS 534 has exceeded its quota or rate of submitting Enhanced Coverage Requests, the SCEF 532 performs element 590 (Enhanced Coverage Response, e.g., Success/Failure) and provides a Cause value appropriately indicating the Failure result.

At operation 530, the SCEF 532 sends an Enhanced Coverage Request (External Identifier or MSISDN, SCEF ID, SCEF Reference ID, Type, Maximum Number of Reports, Duration) message (e.g., Enable/Disable) to the HSS/HLR 224.

At operation 540, the HSS/HLR 224 examines the Enhanced Coverage Request message (e.g., with regard to the existence of External Identifier or MSISDN) to determine whether any included parameters are in the range acceptable for the operator, and whether the Enhanced Coverage is supported by the serving MME/SGSN 221. If this check fails, the HSS/HLR 224 follows element 580 and provides a Cause value indicating the reason for the Failure condition to the SCEF 532.

At operation 550, if required by the specific Enhanced Coverage Request Type and when Enhanced Coverage is supported by the serving MME/SGSN 221, the HSS/HLR 224 sends an Insert Subscriber Data Request (Type, SCEF ID, SCEF Reference ID, Maximum Number of Reports, Duration, SCEF Reference ID for Deletion) message to the MME/SGSN 221.

At operation 560, the MME/SGSN 221 verifies the request (e.g., if the Enhanced Coverage is covered by a roaming agreement when the request is from another PLMN). If this check fails, the MME/SGSN 221 follows element 570 and provides a Cause value indicating the reason for the Failure condition to the SCEF 532. Based on operator policies, the MME/SGSN 221 may also reject the request due to other reasons (e.g., overload or HSS/HLR 224 has exceeded its quota or rate of submitting monitoring requests defined by an SLA). The MME/SGSN 221 sets or resets (i.e., Enables or Disables) Enhanced Coverage Restricted/Allowed parameters in the MME context. The MME/SGSN 221 will transfer the Enhanced Coverage Restricted/Allowed parameters stored as part of its context information during an MME/SGSN 221 change.

At operation 570, if the Enhanced Coverage Restricted/Allowed parameter value update is successful, the MME/SGSN 221 sends an Insert Subscriber Data Answer (Cause) message to the HSS/HLR 224. The MME/SGSN 221 may include the Enhanced Coverage Restricted/Allowed parameter value in the Insert Subscriber Data Answer message.

At operation 580, the HSS/HLR 224 sends an Enhanced Coverage Response (SCEF Reference ID, Cause) message to the SCEF 532. The HSS/HLR 224 includes result=success/failure and the Enhanced Coverage Restricted/Allowed parameter value (in case of success) in the Enhanced Coverage Response message. In the case of UE/MS 201 mobility, the HSS/HLR 224 determines whether the new MME/SGSN 221 supports Enhanced Coverage.

At operation 590, the SCEF 532 sends an Enhanced Coverage Response (SCS/AS Reference ID, Cause) message (Success/Failure) to the SCS/AS 534. The HSS/HLR 224 includes result=success/failure and the Enhanced Coverage Restricted/Allowed parameter value (in case of success) in the Enhanced Coverage Response message. If the HSS/HLR 224 detects that the current serving MME/SGSN 221 cannot support Enhanced Coverage (e.g., after a UE/MS 201 mobility event), the HSS/HLR 224 notifies the SCEF 532 that the Enhanced Coverage Restricted/Allowed is enabled/disabled, and sets the Enhanced Coverage Restricted/Allowed to enabled/disabled value.

Figure 6:
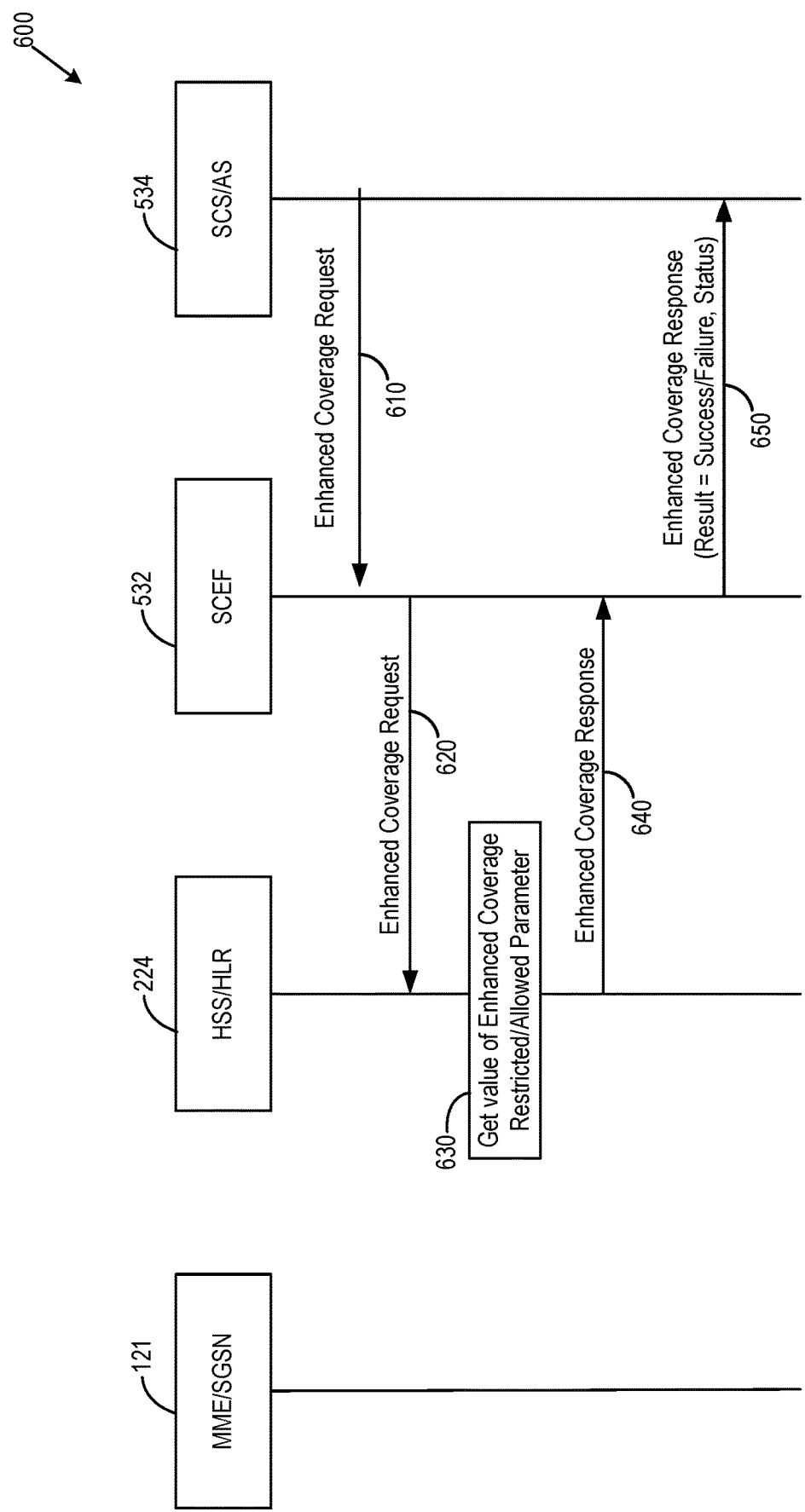
FIG. 6 is a simplified signal flow diagram illustrating a procedure to get status of Enhanced Coverage, according to some embodiments.

FIG. 6 is a simplified signal flow diagram illustrating a procedure 600 to get the status of Enhanced Coverage. The SCS/AS 534 sends 610 an Enhanced Coverage Request (Type—Get status) (External Identifier(s) or MSISDN(s), SCS/AS Identifier, SCS/AS Reference ID, Type, Maximum Number of Reports, Duration) message to the SCEF 532. The SCEF 532 stores SCS/AS Reference ID, SCS/AS Identifier, Duration, and Maximum Number of Reports. The SCEF 532 assigns an SCEF Reference ID. Based on operator policies, if either the SCS/AS 534 is not authorized to perform this request (e.g., if the SLA does not allow for it) or the Enhanced Coverage Request is malformed or the SCS/AS 534 has exceeded its quota or rate of submitting Enhanced Coverage Requests, the SCEF 532 performs element 650 and provides a Cause value appropriately indicating the Failure result.

The SCEF 532 sends 620 an Enhanced Coverage Request (External Identifier or MSISDN, SCEF ID, SCEF Reference ID, Type, Maximum Number of Reports, Duration) message to the HSS/HLR 224. The HSS/HLR 224 examines the Enhanced Coverage Request message, e.g., with regard to the existence of External Identifier or MSISDN, whether the Enhanced Coverage is supported by the serving MME/SGSN 221. If this check fails the HSS/HLR 224 follows element 640 and provides a Cause value indicating the reason for the Failure condition to the SCEF 532. The HSS/HLR 224 gets 630 the value of Enhanced Coverage Restricted/Allowed parameter from the Enhanced Coverage Request.

The HSS/HLR 224 sends 640 an Enhanced Coverage Response (SCEF Reference ID, Cause=Success/Failure and Enhanced Coverage Status=Enabled/Disabled) message to the SCEF 532. The SCEF 532 sends 650 an Enhanced Coverage Response (SCS/AS Reference ID, Cause=Success/Failure, Enhanced Coverage Status=Enabled/Disabled) message to the SCS/AS 534.

The above procedures 500, 600 may be initiated by the operator's O&M subsystem. Also these procedures 500, 600 may apply to a group of devices. In this case instead of External Identifier(s), group external identifier may be provided by the SCS/AS 534. In some embodiments, legacy message(s) with new IE for enhanced coverage may be used instead of new Enhanced Coverage Request/Response message.

Enhanced Coverage and RRC Suspend/Resume Interaction

In legacy networks, as per the RRC connection suspend/resume procedure Enhanced Coverage information is not stored in the RAN Node/AP 211 during suspend mode. The RAN node may include Information for Enhanced Coverage, if available, in the S1 UE Context Suspend Request message. This may, however, change in the future, and the RAN Node/AP 211 may store Enhanced coverage information while in RRC Suspend mode. In such case, the RAN Node/AP would also need to keep the Enhanced Coverage Restricted/Allowed parameter and the MME/SGSN would need to send trigger to the RAN Node/AP 211 to enable and/or disable the paging with enhanced coverage if not authorized by the network (e.g., the HSS/HLR 224 subscription data).

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Embodiments described herein may be implemented into a system using any suitably configured hardware and/or software. FIG. 7 illustrates, for one embodiment, example components of an electronic device 700. In embodiments, the electronic device 700 may be, implement, be incorporated into, or otherwise be a part of a UE/AP, an RAN node (e.g., an eNB, a gNB, etc.), an MME/SGSN, an HSS/HLR, a SCEF, an SCS/AS, or some other electronic device. In some embodiments, the electronic device 700 may include application circuitry 702, baseband circuitry 704, Radio Frequency (RF) circuitry 706, front-end module (FEM) circuitry 708, one or more antennas 710, and power management circuitry (PMC) 712, coupled together at least as shown. The components of the illustrated device 700 may be included in a UE/MS or a RAN node/AP. In some embodiments, the device 700 may include fewer elements (e.g., a RAN node/AP may not utilize the application circuitry 702, and instead include a processor/controller to process IP data received from an EPC). In some embodiments, the device 700 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 702 may include one or more application processors. For example, the application circuitry 702 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the device 700. In some embodiments, processors of the application circuitry 702 may process IPO data packets received from an EPC.

The baseband circuitry 704 may include circuitry such as, but not limited to, one or more single-core or multi-core processors. The baseband circuitry 704 may include one or more baseband processors and/or control logic to process baseband signals received from a receive signal path of the RF circuitry 706 and to generate baseband signals for a transmit signal path of the RF circuitry 706. Baseband processing circuitry 704 may interface with the application circuitry 702 for generation and processing of the baseband signals and for controlling operations of the RF circuitry 706. For example, in some embodiments, the baseband circuitry 704 may include a second generation (2G) baseband processor, a third generation (3G) baseband processor 704A, a fourth generation (4G) baseband processor 704B, a fifth generation (5G) baseband processor 704C and/or other baseband processor(s) 704D for other existing generations, generations in development or to be developed in the future (e.g., 6G, etc.). The baseband circuitry 704 (e.g., one or more of baseband processors 704A-D) may handle various radio control functions that enable communication with one or more radio networks via the RF circuitry 706. In other embodiments, some or all of the functionality of baseband processors 704A-D may be included in modules stored in a memory 704G and executed via a Central Processing Unit (CPU) 704E. The radio control functions may include, but are not limited to, signal modulation/demodulation, encoding/decoding, radio frequency shifting, etc. In some embodiments, modulation/demodulation circuitry of the baseband circuitry 704 may include Fast-Fourier Transform (FFT), precoding, and/or constellation mapping/demapping functionality. In some embodiments, encoding/decoding circuitry of the baseband circuitry 704 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 704 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 704E of the baseband circuitry 704 may be configured to run elements of the protocol stack for signaling of the PHY, MAC, RLC, PDCP and/or RRC layers. In some embodiments, the baseband circuitry 704 may include one or more audio digital signal processor(s) (DSP) 704F. The audio DSP(s) 704F may include elements for compression/decompression and echo cancellation and may include other suitable processing elements in other embodiments.

The baseband circuitry 704 may further include the memory/storage 704G. The memory/storage 704G may be used to load and store data and/or instructions for operations performed by the processors of the baseband circuitry 704. The memory/storage for one embodiment may include any combination of suitable volatile memory and/or non-volatile memory. The memory/storage 704G may include any combination of various levels of memory/storage including, but not limited to, read-only memory (ROM) having embedded software instructions (e.g., firmware), random access memory (e.g., dynamic random access memory (DRAM)), cache, buffers, etc. The memory/storage 704G may be shared among the various processors or dedicated to particular processors.

Components of the baseband circuitry 704 may be suitably combined in a single chip, a single chipset, or disposed on a same circuit board in some embodiments. In some embodiments, some or all of the constituent components of the baseband circuitry 704 and the application circuitry 702 may be implemented together such as, for example, on a system on a chip (SOC).

In some embodiments, the baseband circuitry 704 may provide for communication compatible with one or more radio technologies. For example, in some embodiments, the baseband circuitry 704 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 704 is configured to support radio communications of more than one wireless protocol may be referred to as multi-mode baseband circuitry.

RF circuitry 706 may enable communication with wireless networks using modulated electromagnetic radiation through a non-solid medium. In various embodiments, the RF circuitry 706 may include switches, filters, amplifiers, etc. to facilitate the communication with the wireless network. RF circuitry 706 may include a receive signal path which may include circuitry to down-convert RF signals received from the FEM circuitry 708 and provide baseband signals to the baseband circuitry 704. RF circuitry 706 may also include a transmit signal path which may include circuitry to up-convert baseband signals provided by the baseband circuitry 704 and provide RF output signals to the FEM circuitry 708 for transmission.

In some embodiments, the RF circuitry 706 may include a receive signal path and a transmit signal path. The receive signal path of the RF circuitry 706 may include mixer circuitry 706A, amplifier circuitry 706B and filter circuitry 706C. In some embodiments, the transmit signal path of the RF circuitry 706 may include filter circuitry 706C and mixer circuitry 706A. RF circuitry 706 may also include synthesizer circuitry 706D for synthesizing a frequency for use by the mixer circuitry 706A of the receive signal path and the transmit signal path. In some embodiments, the mixer circuitry 706A of the receive signal path may be configured to down-convert RF signals received from the FEM circuitry 708 based on the synthesized frequency provided by synthesizer circuitry 706D. The amplifier circuitry 706B may be configured to amplify the down-converted signals and the filter circuitry 706C may be a low-pass filter (LPF) or band-pass filter (BPF) configured to remove unwanted signals from the down-converted signals to generate output baseband signals. Output baseband signals may be provided to the baseband circuitry 704 for further processing. In some embodiments, the output baseband signals may be zero-frequency baseband signals, although this is not a requirement. In some embodiments, mixer circuitry 706A of the receive signal path may comprise passive mixers, although the scope of the embodiments is not limited in this respect.

In some embodiments, the mixer circuitry 706A of the transmit signal path may be configured to up-convert input baseband signals based on the synthesized frequency provided by the synthesizer circuitry 706D to generate RF output signals for the FEM circuitry 708. The baseband signals may be provided by the baseband circuitry 704 and may be filtered by filter circuitry 706C. The filter circuitry 706C may include a low-pass filter (LPF), although the scope of the embodiments is not limited in this respect.

In some embodiments, the mixer circuitry 706A of the receive signal path and the mixer circuitry 706A of the transmit signal path may include two or more mixers and may be arranged for quadrature downconversion and/or upconversion respectively. In some embodiments, the mixer circuitry 706A of the receive signal path and the mixer circuitry 706A of the transmit signal path may include two or more mixers and may be arranged for image rejection (e.g., Hartley image rejection). In some embodiments, the mixer circuitry 706A of the receive signal path and the mixer circuitry 706A may be arranged for direct downconversion and/or direct upconversion, respectively. In some embodiments, the mixer circuitry 706A of the receive signal path and the mixer circuitry 706A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 706 may include analog-to-digital converter (ADC) and digital-to-analog converter (DAC) circuitry and the baseband circuitry 704 may include a digital baseband interface to communicate with the RF circuitry 706.

In some dual-mode embodiments, a separate radio IC circuitry may be provided for processing signals for each spectrum, although the scope of the embodiments is not limited in this respect.

In some embodiments, the synthesizer circuitry 706D may be a fractional-N synthesizer or a fractional N/N+1 synthesizer, although the scope of the embodiments is not limited in this respect as other types of frequency synthesizers may be suitable. For example, synthesizer circuitry 706D may be a delta-sigma synthesizer, a frequency multiplier, or a synthesizer comprising a phase-locked loop with a frequency divider.

The synthesizer circuitry 706D may be configured to synthesize an output frequency for use by the mixer circuitry 706A of the RF circuitry 706 based on a frequency input and a divider control input. In some embodiments, the synthesizer circuitry 706D may be a fractional N/N+1 synthesizer.

In some embodiments, frequency input may be provided by a voltage controlled oscillator (VCO), although that is not a requirement. Divider control input may be provided by either the baseband circuitry 704 or the applications processor 702 depending on the desired output frequency. In some embodiments, a divider control input (e.g., N) may be determined from a look-up table based on a channel indicated by the applications circuitry 702.

Synthesizer circuitry 706D of the RF circuitry 706 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 706D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 706 may include an IQ/polar converter.

FEM circuitry 708 may include a receive signal path which may include circuitry configured to operate on RF signals received from one or more antennas 710, amplify the received signals and provide the amplified versions of the received signals to the RF circuitry 706 for further processing. FEM circuitry 708 may also include a transmit signal path which may include circuitry configured to amplify signals for transmission provided by the RF circuitry 706 for transmission by one or more of the one or more antennas 710. In various embodiments, the amplification through the transmit or receive signal paths may be done solely in the RF circuitry 706, solely in the FEM circuitry 708, or in both the RF circuitry 706 and the FEM circuitry 708.

In some embodiments, the FEM circuitry 708 may include a TX/RX switch to switch between transmit mode and receive mode operation. The FEM circuitry 708 may include a receive signal path and a transmit signal path. The receive signal path of the FEM circuitry 708 may include a low-noise amplifier (LNA) to amplify received RF signals and provide the amplified received RF signals as an output (e.g., to the RF circuitry 706). The transmit signal path of the FEM circuitry 708 may include a power amplifier (PA) to amplify input RF signals (e.g., provided by RF circuitry 706), and one or more filters to generate RF signals for subsequent transmission (e.g., by one or more of the one or more antennas 710).

In some embodiments, the PMC 712 may manage power provided to the baseband circuitry 704. In particular, the PMC 712 may control power-source selection, voltage scaling, battery charging, or DC-to-DC conversion. The PMC 712 may often be included when the device 700 is capable of being powered by a battery, for example, when the device 700 is included in a UE. The PMC 712 may increase the power conversion efficiency while providing desirable implementation size and heat dissipation characteristics.

Figure 7:
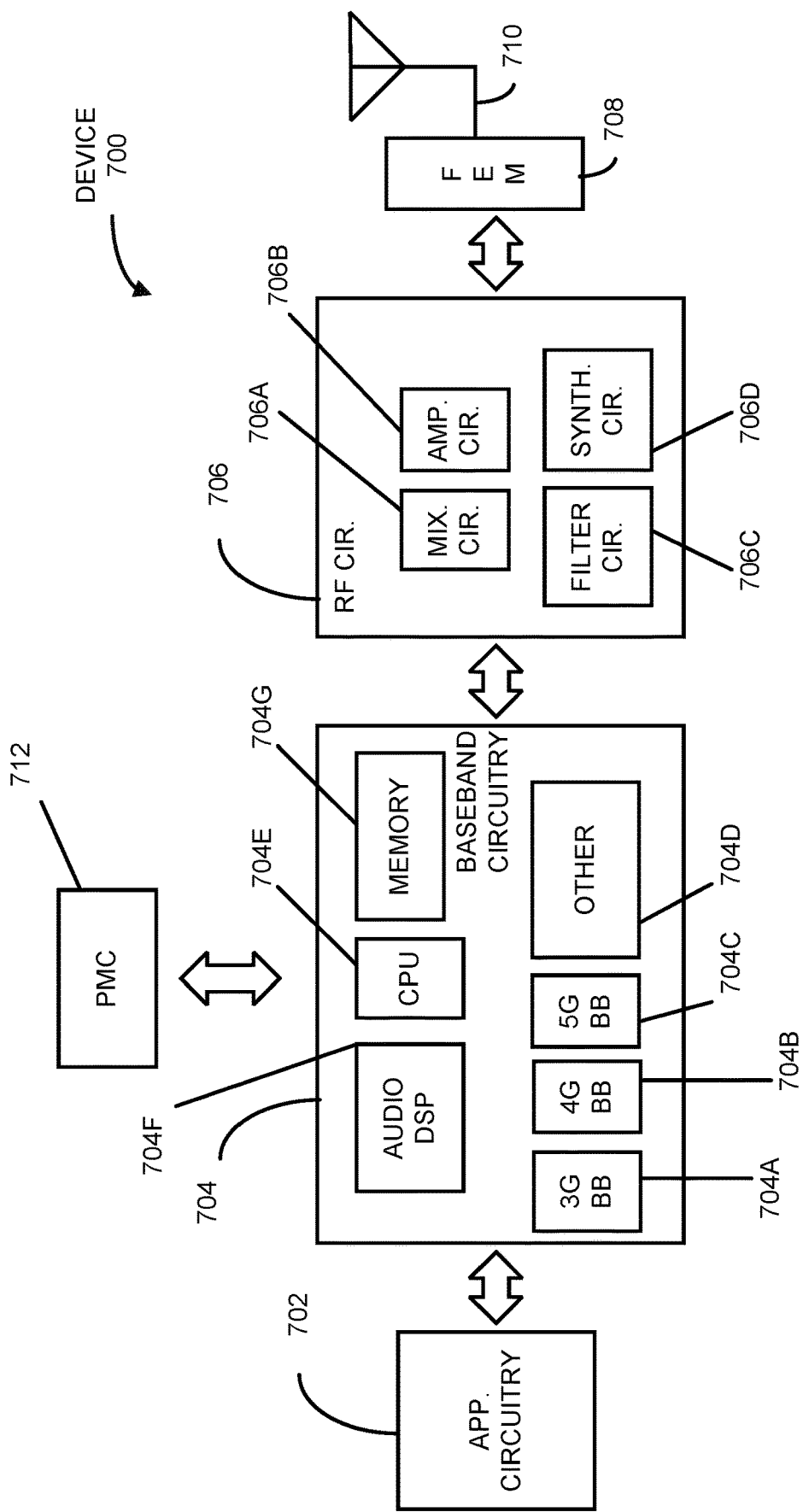
FIG. 7 illustrates, for one embodiment, example components of an electronic device.

FIG. 7 shows the PMC 712 coupled only with the baseband circuitry 704. However, in other embodiments, the PMC 712 may be additionally or alternatively coupled with, and perform similar power management operations for, other components such as, but not limited to, the application circuitry 702, the RF circuitry 706, or the FEM circuitry 708.

In some embodiments, the PMC 712 may control, or otherwise be part of, various power saving mechanisms of the device 700. For example, if the device 700 is in an RRC_Connected state, where it is still connected to the RAN node as it expects to receive traffic shortly, then it may enter a state known as Discontinuous Reception Mode (DRX) after a period of inactivity. During this state, the device 700 may power down for brief intervals of time and thus save power.

If there is no data traffic activity for an extended period of time, then the device 700 may transition off to an RRC_Idle state, where it disconnects from the network and does not perform operations such as channel quality feedback, handover, etc. The device 700 goes into a very low power state and it performs paging where again it periodically wakes up to listen to the network and then powers down again. The device 700 may not receive data in this state, and in order to receive data, it transitions back to an RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 702 and processors of the baseband circuitry 704 may be used to execute elements of one or more instances of a protocol stack. For example, processors of the baseband circuitry 704, alone or in combination, may be used to execute Layer 3, Layer 2, or Layer 1 functionality, while processors of the application circuitry 702 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

In some embodiments, the electronic device 700 may include additional elements such as, for example, memory/storage, display, camera, sensor, and/or input/output (I/O) interface.

In some embodiments, the electronic device 700 of FIG. 7 may be configured to perform one or more processes, techniques, and/or methods as described herein, or portions thereof.

Figure 8:
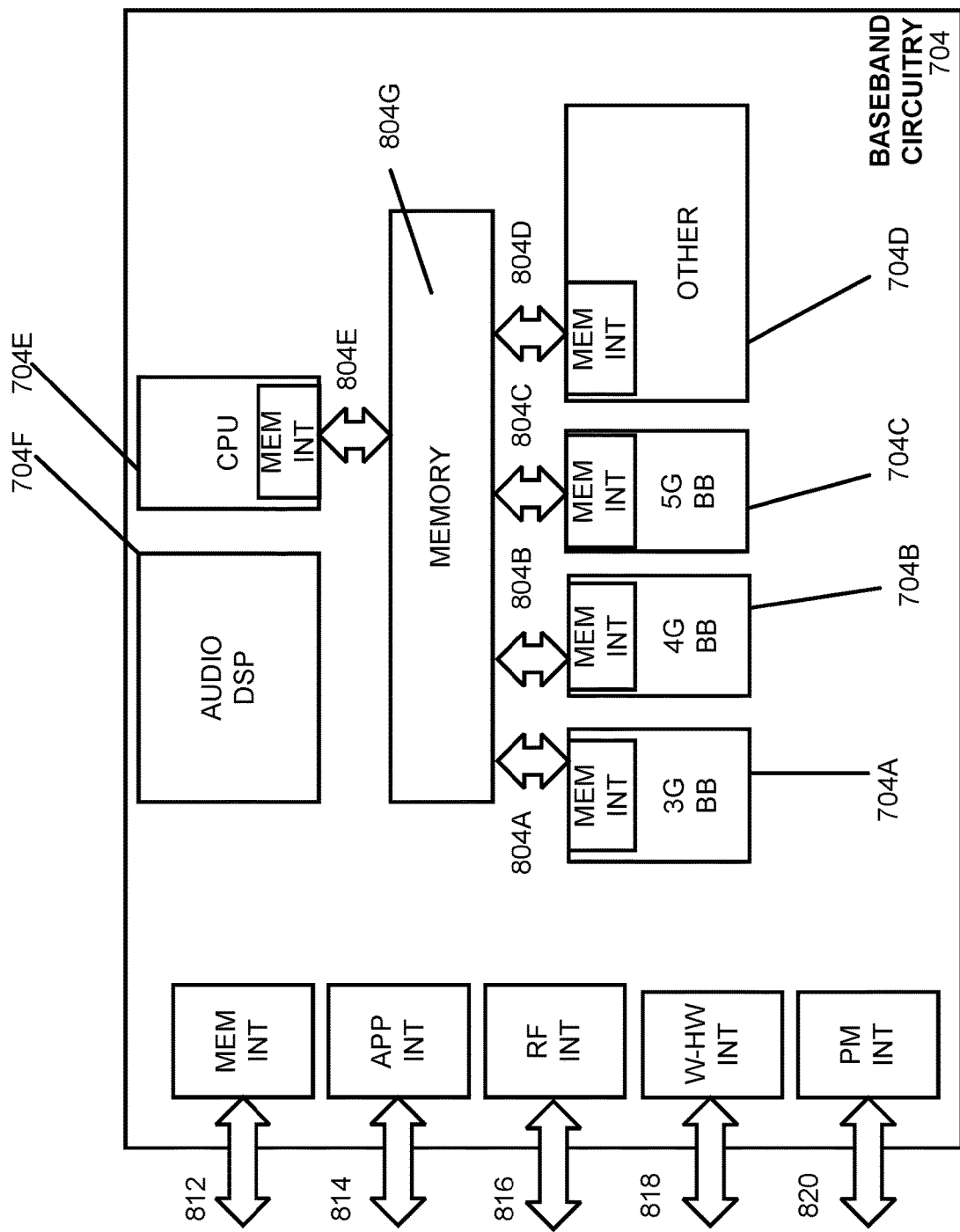
FIG. 8 illustrates example interfaces of baseband circuitry in accordance with some embodiments.

FIG. 8 illustrates example interfaces of baseband circuitry in accordance with some embodiments. As discussed above, the baseband circuitry 704 of FIG. 7 may comprise processors 704A-704E and a memory 704G utilized by said processors. Each of the processors 704A-704E may include a memory interface, 804A-804E, respectively, to send/receive data to/from the memory 704G The baseband circuitry 704 may further include one or more interfaces to communicatively couple to other circuitries/devices, such as a memory interface 812 (e.g., an interface to send/receive data to/from memory external to the baseband circuitry 704), an application circuitry interface 814 (e.g., an interface to send/receive data to/from the application circuitry 702 of FIG. 7), an RF circuitry interface 816 (e.g., an interface to send/receive data to/from RF circuitry 706 of FIG. 7), a wireless hardware connectivity interface 818 (e.g., an interface to send/receive data to/from Near Field Communication (NFC) components, Bluetooth® components (e.g., Bluetooth® Low Energy), Wi-Fi® components, and other communication components), and a power management interface 820 (e.g., an interface to send/receive power or control signals to/from the PMC 712).

Figure 9:
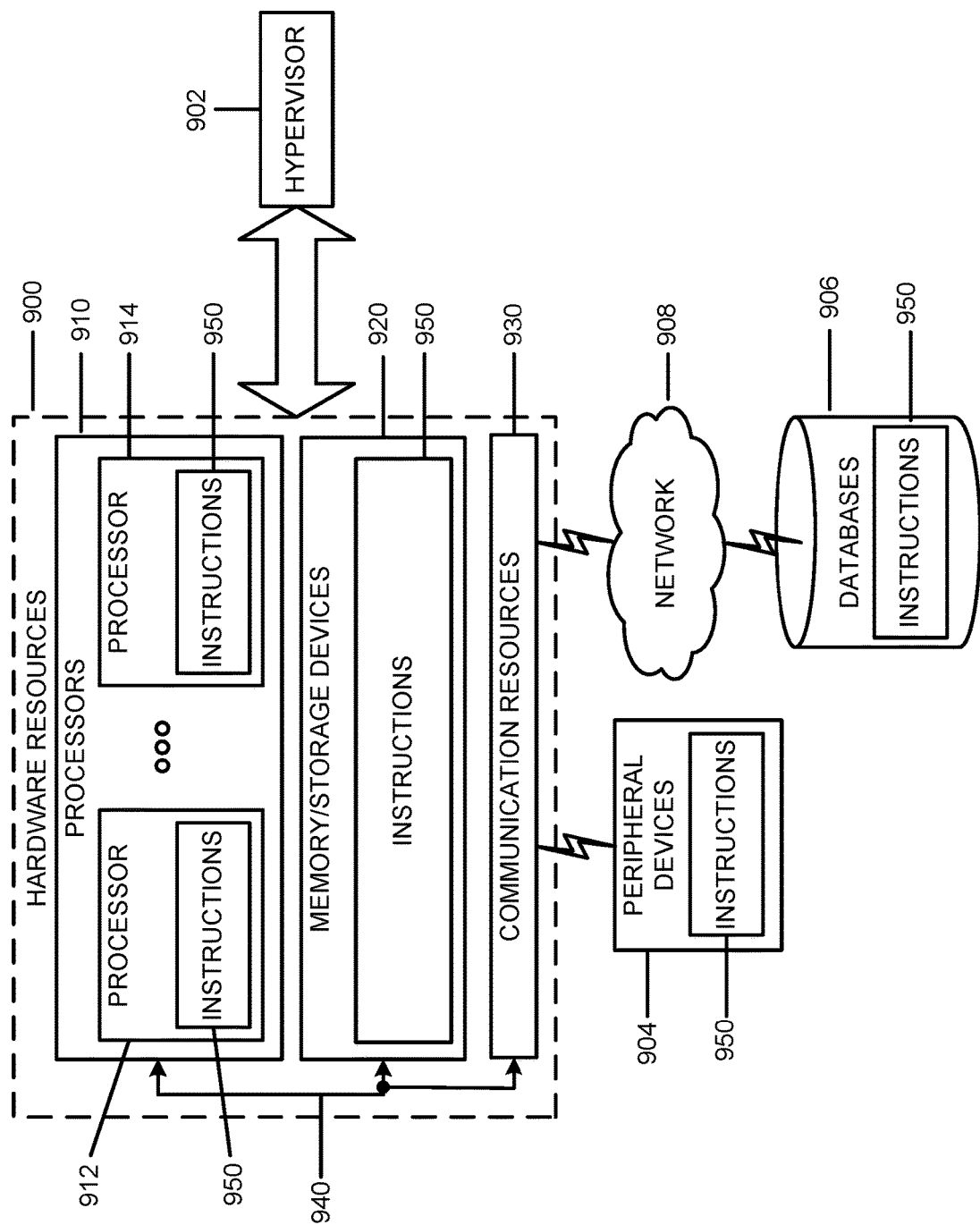
FIG. 9 is a block diagram illustrating components, according to some example embodiments.

FIG. 9 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 9 shows a diagrammatic representation of hardware resources 900 including one or more processors (or processor cores) 910, one or more memory/storage devices 920, and one or more communication resources 930, each of which may be communicatively coupled via a bus 940. For embodiments where node virtualization (e.g., NFV) is utilized, a hypervisor 902 may be executed to provide an execution environment for one or more network slices/sub-slices to utilize the hardware resources 900.

The processors 910 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 912 and a processor 914.

The memory/storage devices 920 may include main memory, disk storage, or any suitable combination thereof. The memory/storage devices 920 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 930 may include interconnection or network interface components or other suitable devices to communicate with one or more peripheral devices 904 or one or more databases 906 via a network 908. For example, the communication resources 930 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 950 may comprise software, a program, an application, an applet, an app, or other executable code for causing at least any of the processors 910 to perform any one or more of the methodologies discussed herein. The instructions 950 may reside, completely or partially, within at least one of the processors 910 (e.g., within the processor's cache memory), the memory/storage devices 920, or any suitable combination thereof. Furthermore, any portion of the instructions 950 may be transferred to the hardware resources 900 from any combination of the peripheral devices 904 or the databases 906. Accordingly, the memory of processors 910, the memory/storage devices 920, the peripheral devices 904, and the databases 906 are examples of computer-readable and machine-readable media.

EXAMPLES

A non-exhaustive list of example embodiments follows. These examples, and embodiments discussed above, are not explicitly discussed herein as combinable with others of the examples and above embodiments in the interest of simplicity and brevity. It is, however, contemplated herein that each of these examples and embodiments are combinable with each other unless it would be apparent to one of ordinary skill in the art that such examples and embodiments are not combinable.

Example 1

A baseband circuitry for a user equipment (UE), the baseband circuitry comprising: a memory configured to store an enhanced coverage restricted parameter received from a Mobility Management Entity (MME), the enhanced coverage restricted parameter indicating whether the UE is restricted from operating in an enhanced coverage mode; and processing circuitry enabled to operate the UE in the enhanced coverage mode, the processing circuitry configured to: determine whether the enhanced coverage mode should be used or not responsive to the enhanced coverage restricted parameter received from the MME; operate the UE in the enhanced coverage mode if it is determined that the UE is not restricted from operating in the enhanced coverage mode; and disable the enhanced coverage mode if it is determined that the enhanced coverage mode is restricted.

Example 2

The baseband circuitry of Example 1, wherein the enhanced coverage mode comprises a mode in which transmissions between the UE and a Radio Access Network (RAN) node are repeated multiple times.

Example 3

The baseband circuitry according to any one of Examples 1 and 2, wherein the processing circuitry is further configured to decode an Attach Accept message from the MME to determine the enhanced coverage restricted parameter.

Example 4

The baseband circuitry according to any one of Examples 1 and 2, wherein the processing circuitry is further configured to decode a Tracking Area Update (TAU) Accept message from the MME to determine the enhanced coverage restricted parameter.

Example 5

The baseband circuitry according to any one of Examples 1-4, wherein the processing circuitry is configured to generate an Attach Request message to be sent to an evolved NodeB (eNB) to initiate an Attach procedure and to indicate that the UE supports restriction of use of the enhanced coverage mode.

Example 6

The baseband circuitry according to any one of Examples 1-4, wherein the processing circuitry is configured to generate a Tracking Area Update (TAU) Request message to be sent to an evolved nodeB (eNB) to initiate a TAU procedure and to indicate that the UE supports restriction for use of the enhanced coverage mode.

Example 7

An apparatus for a Mobility Management Entity (MME) comprising: a processor configured to: decode an enhanced coverage restricted parameter received from a Home Subscriber Server (HSS), the enhanced coverage restricted parameter to indicate whether a User Equipment (UE) is restricted from operating in an enhanced coverage mode; and generate a message to send the enhanced coverage restricted parameter to the UE; and a data storage device configured to store the enhanced coverage restricted parameter.

Example 8

The apparatus of Example 7, wherein the one or more data storage devices are configured to store the enhanced coverage restricted parameter in a Mobile Management (MM) context.

Example 9

The apparatus according to any one of Examples 7 and 8, wherein the processor is configured to generate an S1 Application Protocol (S1-AP) initial context set-up request message to be sent to the eNB, the S1-AP initial context set-up request message configured to indicate the enhanced coverage restricted parameter.

Example 10

The apparatus according to any one of Examples 7-9, wherein the processor is configured to generate an Attach Accept message to transmit the enhanced coverage restricted parameter to the UE.

Example 11

The apparatus according to any one of Examples 7-9, wherein the processor is configured to generate a Tracking Area Update (TAU) Accept message to transmit the enhanced coverage restricted parameter to the UE.

Example 12

The apparatus according to any one of Examples 7-11, wherein the processor is configured to generate a paging message to transmit the information for enhanced coverage to at least one eNB selected by the MME for paging unless the enhanced coverage restricted parameter indicates that the enhanced coverage mode is restricted.

Example 13

An apparatus for a Mobile Station (MS), comprising: a data storage device configured to store an enhanced coverage restricted parameter received from a Serving General Packet Radio Service (GPRS) Support Node (SGSN), the enhanced coverage restricted parameter indicating whether the MS is restricted from operating in an enhanced coverage mode; and a processor enabled to operate the MS in the enhanced coverage mode, the processor configured to: determine whether the enhanced coverage mode should be used or not responsive to the enhanced coverage restricted parameter received from the SGSN; operate the MS in the enhanced coverage mode if it is determined that the MS is not restricted from operating in the enhanced coverage mode; and disable the enhanced coverage mode if it is determined that the enhanced coverage mode is restricted.

Example 14

The apparatus of Example 13, wherein the enhanced coverage mode comprises a mode in which transmissions between the MS and an Access Point (AP) are repeated multiple times.

Example 15

The apparatus according to any one of Examples 13 and 14, wherein the processor is configured to decode an Attach Accept message from the SGSN to determine the enhanced coverage restricted parameter.

Example 16

The apparatus according to any one of Examples 13 and 14, wherein the processor is further configured to decode a Routing Area Update (RAU) Accept message from the SGSN to determine the enhanced coverage restricted parameter.

Example 17

The apparatus according to any one of Examples 13-16, wherein the processor is configured to generate an Attach Request message to be sent to the SGSN to initiate an Attach procedure and to indicate that the MS supports the enhanced coverage mode.

Example 18

The apparatus according to any one of Examples 13-16, wherein the processor is configured to generate a Routing Area Update (RAU) Request message to be sent to the SGSN to initiate a RAU procedure and to indicate that the UE supports restriction for use of the enhanced coverage mode.

Example 19

A computer-readable storage medium having computer-readable instructions stored thereon, the computer-readable instructions configured to instruct a processor for a Serving General Packet Radio Service (GPRS) Support Node (SGSN) to: decode an enhanced coverage restricted parameter from a Home Location Register (HLR), the enhanced coverage restricted parameter specifying whether a Mobile Station (MS) is restricted from using an enhanced coverage functionality; and generate a message to send the enhanced coverage restricted parameter to the MS.

Example 20

The computer-readable storage medium of Example 19, wherein the computer-readable instructions are further configured to instruct the processor to store, in a data storage device, the enhanced coverage restricted parameter in an SGSN Mobile Management (MM) context.

Example 21

The computer-readable storage medium according to any one of Examples 19 and 20, wherein the computer-readable instructions are further configured to instruct the processor to decode an Update Location Acknowledgement (Ack) from the HLR after cancelling of old Mobile Management (MM) context and insertion of new MM context are finished, the Update Location Ack including the enhanced coverage restricted parameter.

Example 22

The computer-readable storage medium of Example 21, wherein the Update Location Ack is received from the HLR via an S6d interface.

Example 23

The computer-readable storage medium according to any one of Examples 19-22, wherein the computer-readable instructions are further configured to instruct the processor to control a communication device to send the enhanced coverage restricted parameter to the MS in an Attach Accept message.

Example 24

The computer-readable storage medium according to any one of Examples 19-22, wherein the computer-readable instructions are further configured to instruct the processor to control a communication device to send the enhanced coverage restricted parameter to the MS in a Routing Area Update (RAU) Accept message.

Example 25

An apparatus for an evolved NodeB (eNB), comprising: a processor; and a data storage device having computer-readable instructions stored thereon, the computer-readable instructions configured to instruct the processor to: decode a message received from a User Equipment (UE), the message configured to indicate that the UE supports restriction for use of enhanced coverage; decode an S1 Application Protocol (S1-AP) initial context set-up request message configured to indicate an enhanced coverage restricted parameter, the S1-AP initial context set-up request message received from a Mobility Management Entity (MME), the enhanced coverage restricted parameter configured to indicate whether the UE is restricted to operate in an enhanced coverage mode; and operate in the enhanced coverage mode for the UE unless the enhanced coverage restricted parameter indicates that the enhanced coverage is restricted.

Example 26

The apparatus of Example 25, wherein the computer-readable instructions are further configured to instruct the processor to: decode a paging message from the MME, the paging message configured to indicate information for enhanced coverage; and refrain from paging the UE with the enhanced coverage if the paging message from the MME does not include enhanced coverage information.

Example 27

The apparatus according to any one of Examples 25-26, wherein the computer-readable instructions are further configured to instruct the processor to decode the message received from the UE by decoding one of a Tracking Area Update Request message received from the UE or by decoding an Attach Request message received from the UE.

Example 28

The apparatus according to any one of Examples 25-27, wherein the enhanced coverage mode comprises an operational mode in which transmissions between the eNB and the UE are repeated multiple times.

Example 29

A method of operating a user equipment (UE), the method comprising: storing an enhanced coverage restricted parameter received from a Mobility Management Entity (MME) in a data storage dave, the enhanced coverage restricted parameter indicating whether the UE is restricted from operating in an enhanced coverage mode; determining whether the enhanced coverage mode should be used or not responsive to the enhanced coverage restricted parameter received from the MME; operating the UE in the enhanced coverage mode if it is determined that the UE is not restricted from operating in the enhanced coverage mode; and disabling the enhanced coverage mode if it is determined that the enhanced coverage mode is restricted.

Example 30

The method of Example 29, wherein operating the UE in the enhanced coverage mode comprises repeating transmissions between the UE and a Radio Access Network (RAN) node multiple times.

Example 31

The method according to any one of Examples 29 and 30, further comprising decoding an Attach Accept message from the MME to determine the enhanced coverage restricted parameter.

Example 32

The method according to any one of Examples 29 and 30, further comprising decoding a Tracking Area Update (TAU) Accept message from the MME to determine the enhanced coverage restricted parameter.

Example 33

The method of according to any one of Examples 29-32, further comprising generating an Attach Request message to be sent to an evolved NodeB (eNB) to initiate an Attach procedure and to indicate that the UE supports restriction of use of the enhanced coverage mode.

Example 34

The method according to any one of Examples 29-32, further comprising generating a Tracking Area Update (TAU) Request message to be sent to an evolved nodeB (eNB) to initiate a TAU procedure and to indicate that the UE supports restriction for use of the enhanced coverage mode.

Example 35

A method of operating a Mobility Management Entity (MME), the method comprising: decoding an enhanced coverage restricted parameter received from a Home Subscriber Server (HSS), the enhanced coverage restricted parameter to indicate whether a User Equipment (UE) is restricted from operating in an enhanced coverage mode; generating a message to send the enhanced coverage restricted parameter to the UE; and storing the enhanced coverage restricted parameter.

Example 36

The method of Example 35, wherein storing the enhanced coverage restricted parameter comprises storing the enhanced coverage restricted parameter in a Mobile Management (MM) context.

Example 37

The method according to any one of Examples 35 and 36, further comprising generating an S1 Application Protocol (S1-AP) initial context set-up request message to be sent to the eNB, the S1-AP initial context set-up request message configured to indicate the enhanced coverage restricted parameter.

Example 38

The method according to any one of Examples 35-37, further comprising generating an Attach Accept message to transmit the enhanced coverage restricted parameter to the UE.

Example 39

The method according to any one of Examples 35-37, further comprising generate a Tracking Area Update (TAU) Accept message to transmit the enhanced coverage restricted parameter to the UE.

Example 40

The method according to any one of Examples 35-39, further comprising generating a paging message to transmit information for enhanced coverage to at least one eNB selected by the MME for paging unless the enhanced coverage restricted parameter indicates that the enhanced coverage mode is restricted.

Example 41

A method of operating a Mobile Station (MS), the method comprising: storing an enhanced coverage restricted parameter received from a Serving General Packet Radio Service (GPRS) Support Node (SGSN), the enhanced coverage restricted parameter indicating whether the MS is restricted from operating in an enhanced coverage mode; determining whether the enhanced coverage mode should be used or not responsive to the enhanced coverage restricted parameter received from the SGSN; operating the MS in the enhanced coverage mode if it is determined that the MS is not restricted from operating in the enhanced coverage mode; and disabling the enhanced coverage mode if it is determined that the enhanced coverage mode is restricted.

Example 42

The method of Example 41, wherein operating the MS in the enhanced coverage mode comprises repeating transmissions between the MS and an Access Point (AP) multiple times.

Example 43

The method of according to any one of Examples 41 and 42, further comprising decoding an Attach Accept message from the SGSN to determine the enhanced coverage restricted parameter.

Example 44

The method according to any one of Examples 41 and 42, further comprising decoding a Routing Area Update (RAU) Accept message from the SGSN to determine the enhanced coverage restricted parameter.

Example 45

The method according to any one of Examples 41-44, further comprising generating an Attach Request message to be sent to the SGSN to initiate an Attach procedure and to indicate that the MS supports the enhanced coverage mode.

Example 46

The method according to any one of Examples 41-44, further comprising generating a Routing Area Update (RAU) Request message to be sent to the SGSN to initiate a RAU procedure and to indicate that the UE supports restriction for use of the enhanced coverage mode.

Example 47

A method of operating a Serving General Packet Radio Service (GPRS) Support Node (SGSN), the method comprising: decoding an enhanced coverage restricted parameter from a Home Location Register (HLR), the enhanced coverage restricted parameter specifying whether a Mobile Station (MS) is restricted from using an enhanced coverage functionality; and generating a message to send the enhanced coverage restricted parameter to the MS.

Example 48

The method of Example 47, further comprising storing, in a data storage device, the enhanced coverage restricted parameter in an SGSN Mobile Management (MM) context.

Example 49

The method according to any one of Examples 47 and 48, further comprising decoding an Update Location Acknowledgement (Ack) from the HLR after cancelling of old Mobile Management (MM) context and insertion of new MM context are finished, the Update Location Ack including the enhanced coverage restricted parameter.

Example 50

The method of Example 49, further comprising receiving the Update Location Ack from the HLR via an S6d interface.

Example 51

The method according to any one of Examples 47-50, further comprising sending the enhanced coverage restricted parameter to the MS in an Attach Accept message.

Example 52

The method according to any one of Examples 47-50, further comprising sending the enhanced coverage restricted parameter to the MS in a Routing Area Update (RAU) Accept message.

Example 53

A method of operating an evolved NodeB (eNB), the method comprising: decoding a message received from a User Equipment (UE), the message configured to indicate that the UE supports restriction for use of enhanced coverage; decoding an S1 Application Protocol (S1-AP) initial context set-up request message configured to indicate an enhanced coverage restricted parameter, the S1-AP initial context set-up request message received from a Mobility Management Entity (MME), the enhanced coverage restricted parameter configured to indicate whether the UE is restricted to operate in an enhanced coverage mode; and operating in the enhanced coverage mode for the UE unless the enhanced coverage restricted parameter indicates that the enhanced coverage is restricted.

Example 54

The method of Example 53, further comprising: decoding a paging message from the MME, the paging message configured to indicate information for enhanced coverage; and refraining from paging the UE with the enhanced coverage if the paging message from the MME does not include enhanced coverage information.

Example 55

The method according to any one of Examples 53 and 54, wherein decoding the message received from the UE comprises decoding one of a Tracking Area Update Request message received from the UE or decoding an Attach Request message received from the UE.

Example 56

The method according to any one of Examples 53-55, wherein operating in the enhanced coverage mode for the UE comprises an repeating transmissions between the eNB and the UE are multiple times.

Example 57

A computer-readable storage medium having computer-readable instructions stored thereon, the computer-readable instructions configured to instruct at least one processor to perform the method according to any one of Examples 29-56.

Example 58

A means for performing the method according to any one of Examples 29-56.

Example 59 may include a user equipment (UE) device that has enhancements and optimizations for features and capabilities relating to Cellular Internet of Things (CIoT) (e.g., enhanced coverage) for connecting to an EPS network that is also enhanced for CIoT features. The EPS network may include entities such as eNB, MME, SGW, PGW, SCEF (Service Capability Exposure Function), etc.

Example 60 may include the UE of example 59 and/or some other example herein, wherein the UE supporting enhanced coverage is not paged with enhanced coverage information because it is disabled at MME.

Example 61 may include eNB has enhancements and optimizations for features and capabilities relating to Cellular Internet of Things (CIoT) (e.g., enhanced coverage) for connecting to an EPS network that is also enhanced for CIoT features.

Example 62 may include the eNB of example 61 and/or some other example herein, wherein the eNB supporting enhanced coverage receives paging message without enhanced coverage because it is disabled at MME.

Example 63 may include the eNB of example 61 and/or some other example herein, wherein the eNB receives indication from MME that enhanced coverage is enabled or disabled.

Example 64 may include MME has enhancements and optimizations for features and capabilities relating to Cellular Internet of Things (CIoT) (e.g., enhanced coverage) for connecting to an EPS network that is also enhanced for CIoT features.

Example 65 may include the MME of example 64 and/or some other example herein, which stores the Enhanced Coverage Allowed parameter in the MM Context.

Example 66 may include the MME of example 64 and/or some other example herein, which stores the Enhanced Coverage Allowed parameter in the EPS Bearer Context.

Example 67 may include the MME of example 64 and/or some other example herein, which receives value of Enhanced Coverage Allowed parameter from HSS in Insert Subscriber Data Request message.

Example 68 may include the MME of example 64 and/or some other example herein, which receives value of Enhanced Coverage Allowed parameter from HSS in Update Location Request message.

Example 69 may include the MME of example 64 and/or some other example herein, which sends value of Enhanced Coverage Allowed parameter to HSS in Update Location Answer message.

Example 70 may include HSS has enhancements and optimizations for features and capabilities relating to Cellular Internet of Things (CIoT) (e.g., enhanced coverage) for connecting to an EPS network that is also enhanced for CIoT features.

Example 71 may include HSS of example 70 and/or some other example herein, which stores the Enhanced Coverage Allowed parameter per PLMN for the given UE in the HSS UE subscription data.

Example 72 may include the HSS of example 70 and/or some other example herein, which sends value of Enhanced Coverage Allowed parameter to MME in Insert Subscriber Data Request message.

Example 73 may include the HSS of example 70 and/or some other example herein, which receives value of Enhanced Coverage Allowed parameter to MME in Insert Subscriber Data Answer message.

Example 74 may include the HSS of example 70 and/or some other example herein, which sends value of Enhanced Coverage Allowed parameter to MME in Insert Subscriber Data Request message.

Example 75 may include the HSS of example 70 and/or some other example herein, which receives Enhanced Coverage Request message from SCEF with Type set to Enable or Disable.

Example 76 may include the HSS of example 70 and/or some other example herein, which receives Enhanced Coverage Request message from SCEF with Type set to value to retrieve status of Enhanced Coverage Allowed parameter.

Example 77 may include the HSS of example 70 and/or some other example herein, which sends Enhanced Coverage Response message to SCEF with Type set to Enable or Disable and result set to success or failure.

Example 78 may include the HSS of example 70 and/or some other example herein, which sends Enhanced Coverage Response message to SCEF with Type set to value to retrieve status of Enhanced Coverage Allowed parameter.

Example 79 may include SCEF has enhancements and optimizations for features and capabilities relating to Cellular Internet of Things (CIoT) (e.g., enhanced coverage) for connecting to an EPS network that is also enhanced for CIoT features.

Example 80 may include the SCEF of example 79 and/or some other example herein, which sends Enhanced Coverage Request message to HSS with Type set to Enable or Disable.

Example 81 may include the SCEF of example 79 and/or some other example herein, which sends Enhanced Coverage Request message to HSS with Type set to value to retrieve status of Enhanced Coverage Allowed parameter.

Example 82 may include the SCEF of example 79 and/or some other example herein, which receives Enhanced Coverage Response message from HSS with Type set to Enable or Disable and result set to success or failure.

Example 83 may include the SCEF of example 79 and/or some other example herein, which receives Enhanced Coverage Response message from HSS with Type set to value to retrieve status of Enhanced Coverage Allowed parameter.

Example 84 may include the SCEF of example 79 and/or some other example herein, which receives Enhanced Coverage Request message from SCS/AS with Type set to Enable or Disable.

Example 85 may include the SCEF of example 79 and/or some other example herein, which receives Enhanced Coverage Request message from SCS/AS with Type set to value to retrieve status of Enhanced Coverage Allowed parameter.

Example 86 may include an apparatus comprising means to perform one or more elements of a method described in or related to any of examples 59-85, or any other method or process described herein.

Example 87 may include one or more non-transitory computer-readable media comprising instructions to cause an electronic device, upon execution of the instructions by one or more processors of the electronic device, to perform one or more elements of a method described in or related to any of examples 59-85, or any other method or process described herein.

Example 88 may include an apparatus comprising logic, modules, and/or circuitry to perform one or more elements of a method described in or related to any of examples 59-85, or any other method or process described herein.

Example 89 may include a method, technique, or process as described in or related to any of examples 59-85, or portions or parts thereof.

Example 90 may include an apparatus comprising: one or more processors and one or more computer-readable media comprising instructions that, when executed by the one or more processors, cause the one or more processors to perform the method, techniques, or process as described in or related to any of examples 59-85, or portions thereof.

Example 91 may include a method of communicating in a wireless network as shown and described herein.

Example 92 may include a system for providing wireless communication as shown and described herein.

Example 93 may include a device for providing wireless communication as shown and described herein.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

It will be apparent to those having skill in the art that many changes may be made to the details of the above-described embodiments without departing from the underlying principles of the invention. The scope of the present invention should, therefore, be determined only by the following claims.

The invention claimed is:

1. An apparatus for a service capability exposure function (SCEF) of a wireless communication system, the apparatus comprising:
a memory interface to send or receive, to or from a memory device, a server identifier (ID); and
a processor to:
process an enhanced coverage request from a server, the enhanced coverage request including the server ID and a request type, wherein the request type indicates if the enhanced coverage request is to query a status of, or to enable, or to disable the enhanced coverage restriction;
determine if the server is not authorized to perform the enhanced coverage request, if the enhanced coverage request is malformed, and if the server has exceeded a quota or rate of submitting enhanced coverage requests;
prepare a second enhanced coverage request to be sent to a home subscriber server (HSS), wherein the second enhanced coverage request is used to set a value of an enhanced coverage restriction parameter based on the request type when the request type indicates that the enhanced coverage request is to enable or disable the enhanced coverage restriction,
wherein a user equipment (UE) is informed of the value of the enhanced coverage restriction parameter at a Routing Area Update (RAU) procedure or a Tracking Area Update (TAU) procedure, the enhanced coverage restricted parameter indicating whether the UE is restricted from operating in an enhanced coverage mode;
receive an SCEF reference ID and a cause value from the HSS, wherein the cause value indicates whether the enhanced coverage request succeeded or failed; and
prepare an enhanced coverage response to be sent to the server to indicate a result from the enhanced coverage request.

2. The apparatus of claim 1, wherein the enhanced coverage request further includes an external ID or a mobile station international subscriber directory number (MSISDN).

3. The apparatus of claim 1, wherein the enhanced coverage request enables the third-party service provider to query a status of, enable, or disable enhanced coverage restrictions per user equipment.

4. The apparatus of claim 1, wherein the processor is further to assign the SCEF reference ID to the enhanced coverage request.

5. The apparatus of claim 4, wherein the second enhanced coverage request comprises an external ID or mobile station international subscriber directory number (MSISDN), SCEF ID, the SCEF Reference ID, and the request type.

6. The apparatus of claim 1, wherein the enhanced coverage response includes the cause value that indicates whether the enhanced coverage request succeeded or failed.

7. The apparatus of claim 1, wherein the server comprises at least one of a services capability server (SCS) and an application server (AS).

8. A non-transitory computer-readable storage medium having computer-readable instructions stored thereon, the computer-readable instructions to, when executed, instruct a processor of a service capability exposure function (SCEF) node to:
receive an enhanced coverage request from a server comprising a request type, wherein the request type indicates if the enhanced coverage request is to query a status of, or to enable, or to disable the enhanced coverage restriction;
determine if the server is not authorized to perform the enhanced coverage request, if the enhanced coverage request is malformed, and if the server has exceeded a quota or rate of submitting enhanced coverage requests;
send a second enhanced coverage request to be sent to a home subscriber server (HSS), wherein the second enhanced coverage request is used to set a value of an enhanced coverage restriction parameter based on the request type when the request type indicates that the enhanced coverage request is to enable or disable the enhanced coverage restriction,
wherein a user equipment (UE) is informed of the value of the enhanced coverage restriction parameter at a Routing Area Update (RAU) procedure or a Tracking Area Update (TAU) procedure, the enhanced coverage restricted parameter indicating whether the UE is restricted from operating in an enhanced coverage mode;
receive an SCEF reference identifier and a cause value from the HSS, wherein the cause value indicates whether the enhanced coverage request succeeded or failed; and
prepare an enhanced coverage response to be sent to the server to indicate a result from the enhanced coverage request.

9. The non-transitory computer-readable storage medium of claim 8, wherein the enhanced coverage request includes an external identifier or a mobile station international subscriber directory number (MSISDN), a server identifier, and the request type.

10. The non-transitory computer-readable storage medium of claim 8, wherein
the second enhanced coverage request to be sent to the HSS comprises an external identifier or a mobile station international subscriber directory number (MSISDN), SCEF identifier, the SCEF Reference identifier, and the request type.

11. The non-transitory computer-readable storage medium of claim 8, wherein the enhanced coverage response includes the cause value that indicates whether the enhanced coverage request succeeded or failed.

12. The non-transitory computer-readable storage medium of claim 8, wherein the server comprises at least one of a services capability server (SCS) and an application server (AS).

13. An apparatus for a home subscriber server (HSS), the apparatus comprising:
an interface to receive, from a service capability exposure function (SCEF), an enhanced coverage request, wherein the enhanced coverage request comprises a request type, wherein the request type indicates if the enhanced coverage request is to query a status of, or to enable, or to disable the enhanced coverage restriction; and
a processor to:
examine an enhanced coverage request message to determine:
whether parameters included in the enhanced coverage request are in an acceptable range, and
whether enhanced coverage is supported by a serving mobility management entity (MME) or supporting node (SGSN);
set a value of an enhanced coverage restriction parameter based on the request type when the request type indicates that the enhanced coverage request is to enable or disable the enhanced coverage restriction, wherein a user equipment (UE) is informed of the value of the enhanced coverage restriction parameter at a Routing Area Update (RAU) procedure or a Tracking Area Update (TAU) procedure, the enhanced coverage restricted parameter indicating whether the UE is restricted from operating in an enhanced coverage mode; and
prepare an enhanced coverage response to be sent to the SCEF to indicate a result from the enhanced coverage request, wherein the enhanced coverage response includes an SCEF reference identifier and a cause value that indicates whether the enhanced coverage request succeeded or failed.

14. The apparatus of claim 13, wherein the enhanced coverage request further comprises an external identifier or mobile station international subscriber directory number (MSISDN), SCEF identifier, and the SCEF Reference identifier.

15. The apparatus of claim 14, wherein if the request type is to get a current status of enhanced coverage, the processor is further to retrieve a value of an Enhanced Coverage Restricted/Allowed parameter, and send the value of the Enhanced Coverage Restricted/Allowed parameter to the SCEF.

16. The apparatus of claim 14, further comprising a second interface to send an Insert Subscriber Data Request comprising type, SCEF identifier, SCEF Reference identifier, and the SCEF Reference identifier message to a mobility function node if the request type is to enable or to disable enhanced coverage.

* * * * *